(12) United States Patent
Kim et al.

(10) Patent No.: US 12,174,741 B2
(45) Date of Patent: *Dec. 24, 2024

(54) NEURAL PROCESSING DEVICE

(71) Applicant: Rebellions Inc., Seongnam-si (KR)

(72) Inventors: Jinseok Kim, Seongnam-si (KR);
Jinwook Oh, Seongnam-si (KR);
Donghan Kim, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,102

(22) Filed: Aug. 10, 2023

(65) Prior Publication Data

US 2023/0385198 A1 Nov. 30, 2023

Related U.S. Application Data

(63) Continuation of application No. 18/057,183, filed on Nov. 18, 2022, now Pat. No. 11,775,437.

(30) Foreign Application Priority Data

Mar. 31, 2022 (KR) .................. 10-2022-0040666

(51) Int. Cl.
*G06F 12/084* (2016.01)
(52) U.S. Cl.
CPC ...... *G06F 12/084* (2013.01); *G06F 2212/622* (2013.01)
(58) Field of Classification Search
CPC ............ G06F 12/084; G06F 2212/622; G06F 13/1689; G06F 9/30087; G06F 30/394

USPC .......................................... 711/147
See application file for complete search history.

(56) References Cited

U.S. PATENT DOCUMENTS

| 2013/0160028 | A1 | 6/2013 | Black |
| 2017/0123794 | A1 | 5/2017 | Chen et al. |
| 2020/0050451 | A1* | 2/2020 | Babich ............ G06T 1/20 |
| 2022/0011852 | A1* | 1/2022 | Udhayan .......... H04W 52/0216 |

(Continued)

FOREIGN PATENT DOCUMENTS

KR 10-2258566 B1 6/2021

OTHER PUBLICATIONS

Extended European Search Report for EP 22213541.0 by European Patent Office dated Jul. 26, 2023.

(Continued)

*Primary Examiner* — Hashem Farrokh
(74) *Attorney, Agent, or Firm* — BROADVIEW IP LAW, PC

(57) ABSTRACT

A neural processing device is provided. The neural processing device comprises: a processing unit configured to perform calculations, an L0 memory configured to receive data from the processing unit and provide data to the processing unit, and an LSU (Load/Store Unit) configured to perform load and store operations of the data, wherein the LSU comprises: a neural core load unit configured to issue a load instruction of the data, a neural core store unit configured to issue a store instruction for transmitting and storing the data, and a sync ID logic configured to provide a sync ID to the neural core load unit and the neural core store unit to thereby cause a synchronization signal to be generated for each sync ID.

14 Claims, 32 Drawing Sheets

(56) References Cited

U.S. PATENT DOCUMENTS

2022/0043770 A1\* 2/2022 Yuan ................ G06F 17/153
2022/0083338 A1 3/2022 Gonion et al.

OTHER PUBLICATIONS

Office Action for KR 10-2022-0040666 by Korean Intellectual Property Office dated May 20, 2024.

\* cited by examiner

NEURAL PROCESSING DEVICE

CROSS-REFERENCE TO RELATED APPLICATION

This application is a continuation of U.S. application Ser. No. 18/057,183, filed on Nov. 18, 2022, which claims priority under 35 U.S.C § 119 to Korean Patent Application No. 10-2022-0040666 filed in the Korean Intellectual Property Office on Mar. 31, 2022, the entire contents of which are hereby incorporated by reference.

TECHNICAL FIELD

The disclosure relates to a neural processing device. More particularly, the disclosure relates to a neural processing device that has minimized the waiting time for an instruction issue.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

A synchronization signal refers to a signal indicating that each hardware element has completed an operation, so as to perform the next operation. The transmission of such synchronization signals must be performed in sequence, and only when one operation is completed, the next operation can be performed at last, inevitably resulting in a waiting time to occur.

Therefore, it is high time to think about various ways to minimize such a waiting time.

SUMMARY

Aspects of the disclosure provide a neural processing device that groups load and store instructions and executes them in parallel.

According to some aspects of the disclosure, a neural processing device includes: a processing unit configured to perform calculations, an L0 memory configured to receive data from the processing unit and provide data to the processing unit, and an LSU (Load/Store Unit) configured to perform load and store operations of the data, wherein the LSU includes: a neural core load unit configured to issue a load instruction of the data, a neural core store unit configured to issue a store instruction for transmitting and storing the data, and a sync ID logic configured to provide a sync ID to the neural core load unit and the neural core store unit to thereby cause a synchronization signal to be generated for each sync ID.

According to some aspects, instructions include the load instruction and the store instruction, the instructions include at least one group, and each of the at least one group includes at least one operation instruction and a sync signal indicating completion of an issue of the operation instruction.

According to some aspects, the sync ID logic includes: a current sync ID register configured to store a sync ID for each group of the instructions being issued, a sync ID MO counter configured to count MOs according to the number of issues of the operation instructions and interconnection returns for the operation instructions for each sync ID, and a sync queue configured to store the sync signals by each group, and send out the sync signals in sequence when the MO becomes 0.

According to some aspects, the at least one group includes a first group and a second group, and the sync ID MO counter includes: a first MO counter configured to count the MOs of the first group, and a second MO counter configured to count the MOs of the second group.

According to some aspects, the first MO counter is increased by 1 each time the operation instruction of the first group is issued.

According to some aspects, the first MO counter is decreased by 1 each time the interconnection return for the operation instruction of the first group is returned.

According to some aspects, the sync queue: stores the sync signal of the first group when issued, stores the sync signal of the second group in sequence subsequent to the sync signal of the first group when issued, outputs the sync signal of the first group when the first MO counter becomes 0, and outputs the sync signal of the second group when the second MO counter becomes 0.

According to some aspects, the sync queue outputs the sync signal of the first group and the sync signal of the second group in sequence.

According to some aspects, the at least one group further includes a third group, the first group and the second group have a dependency on each other, and the third group is independent of the first and second groups.

According to some aspects, a first time between an issue end time of the operation instructions of the first group and an issue start time of the operation instructions of the second group is equal to a second time between an issue end time of the operation instructions of the second group and an issue start time of the operation instructions of the third group.

According to some aspects, the sync queue is of a FIFO (First In, First Out) structure.

According to some aspects, the current sync ID register changes and stores the sync ID of a group corresponding to the sync signal after a preset fixed cycle when the sync signal is issued.

According to some aspects, the neural processing device, further includes a local interconnection configured to receive data from the LSU and transmit the data, wherein when the instruction is issued, an interconnection request according to the instruction is transmitted to the local interconnection, and time points of a transmission of the interconnection request and an issue of the instruction differ by a preset fixed cycle.

According to some aspects, the local interconnection transmits an interconnection return corresponding to the interconnection request to the LSU, and time points of a reception of the interconnection return and the transmission of the interconnection request differ by a non-fixed cycle that is not predetermined.

According to some aspects of the disclosure, a neural processing device includes: at least one neural core, an L1 shared memory shared by the at least one neural core, an L1 interconnection configured to transmit data between the at least one neural core and the L1 shared memory, and an L1 sync path configured to transmit a synchronization signal between the at least one neural core and the L1 shared memory, wherein each of the at least one neural core includes: a processing unit configured to perform calculations, an L0 memory configured to store data inputted into and outputted from the processing unit, and an LSU configured to perform a load and/or store operation of the data and thereby generate the synchronization signal, and wherein the LSU issues instructions for each of a plurality of groups, and intervals between time points of the issues of the instructions for each of the plurality of groups are equal to one another, as a first time.

According to some aspects, the magnitude of the first time is preset.

According to some aspects, the instructions include a load instruction and a store instruction.

According to some aspects, the plurality of groups includes at least one operation instruction and a sync signal indicating that an issue of the operation instruction ends.

According to some aspects, the LSU includes a sync ID logic configured to provide a sync ID for each of the plurality of groups.

According to some aspects, the sync ID logic includes an MO counter configured to count MOs for each group according to the issue of the operation instructions and interconnection returns for the operation instructions.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

The neural processing device of the disclosure can issue and transmit synchronization signals without any waiting time, thereby maximizing the speed of the device.

In addition, the instructions can be executed in a preset order even if there is no waiting time through synchronization by each group.

In addition to the foregoing, the specific effects of the disclosure will be described together while elucidating the specific details for carrying out the embodiments below.

DETAILED DESCRIPTION OF THE PREFERRED EMBODIMENTS

Figure 1:
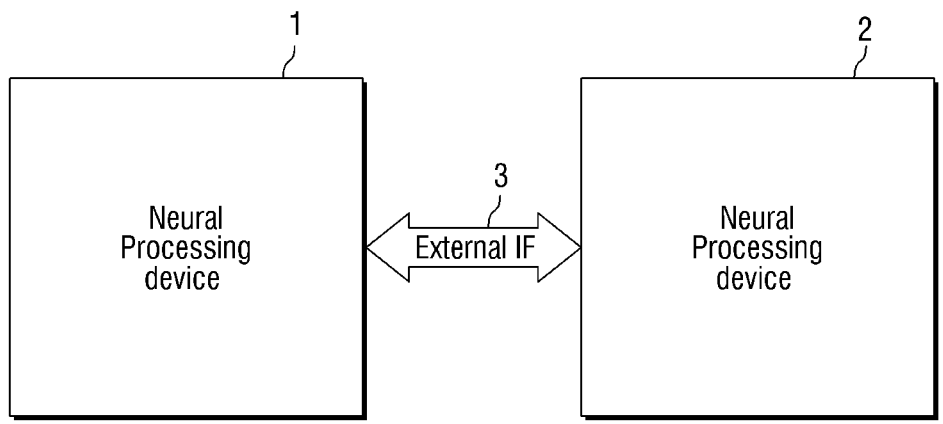
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

When a part is said to include "at least one of a, b or c", this means that the part may include only a, only b, only c, both a and b, both a and c, both b and c, all of a, b and c, or variations thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 30.

FIG. 1 is a block diagram for illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 2:
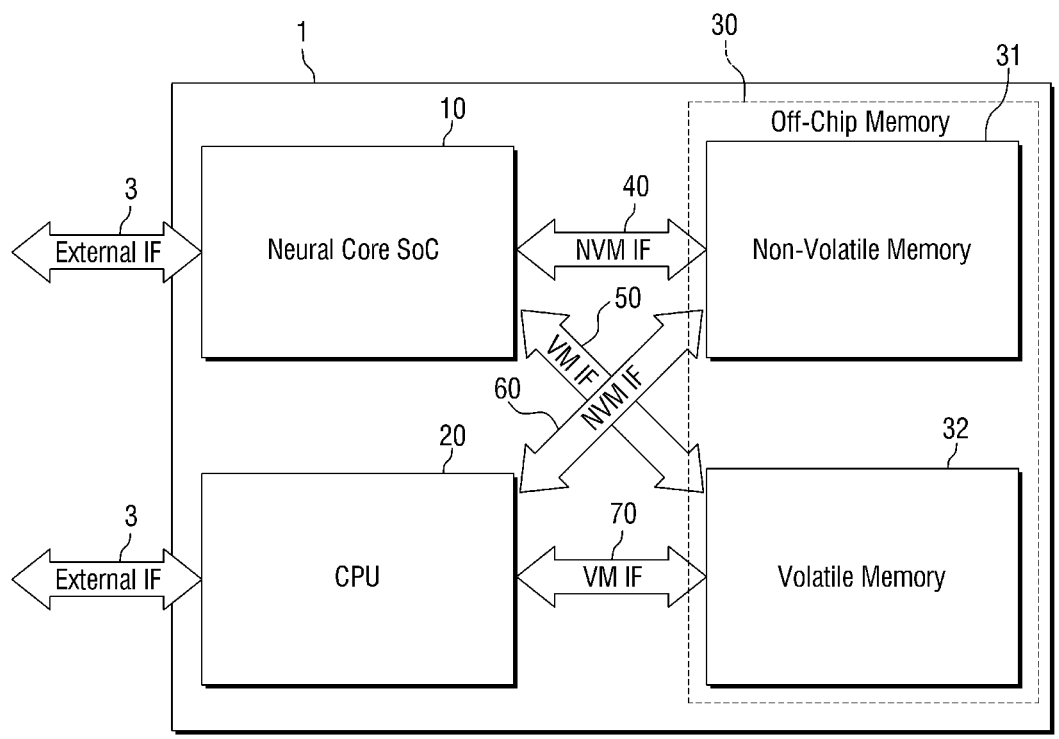
FIG. 2 is a block diagram for illustrating the neural processing device of FIG. 1.

FIG. 2 is a block diagram for illustrating the neural processing device of FIG. 1.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation device and may be an accelerator. The neural core SoC 10 may be, for example, any one of a graphics processing unit (GPU), a field-programmable gate array (FPGA), and an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are used a lot in deep learning. Accordingly, there can be high efficiency by performing calculations in deep learning inference and training tasks by the neural core SoC 10.

The CPU 20 may exchange data with other external calculation devices via the external interface 3. In addition, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
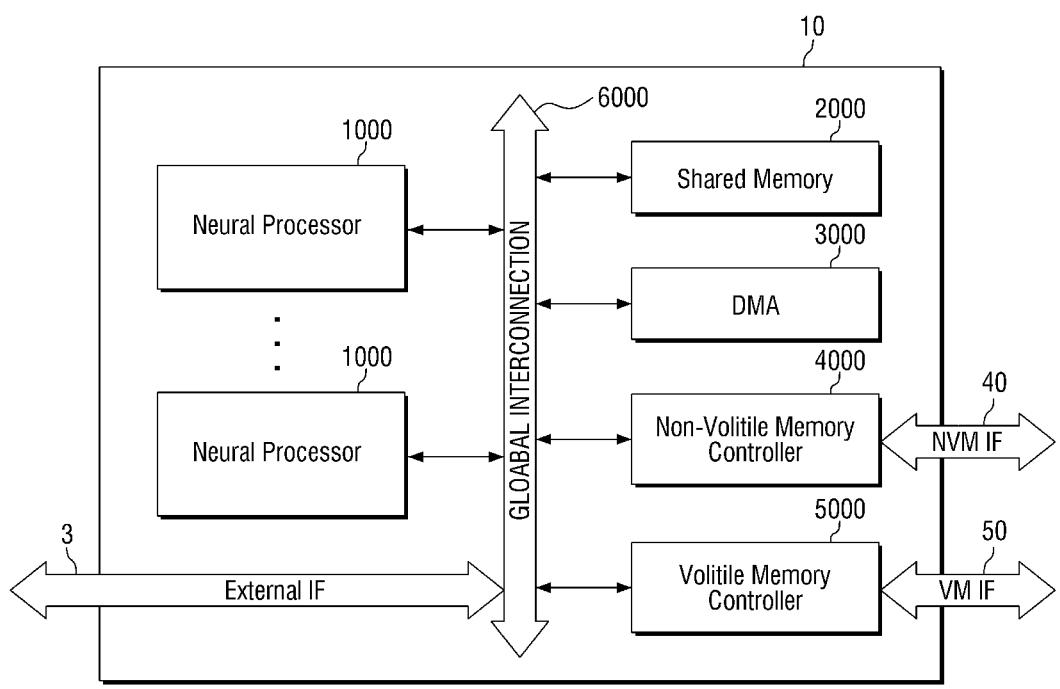
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the non-volatile memory 31 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device in accordance with some embodiments, the scheduling task is also performed by the individual neural processors 1000, and thus, the performance of the device can be improved without even a scheduling burden resulting therefrom.

Figure 4:
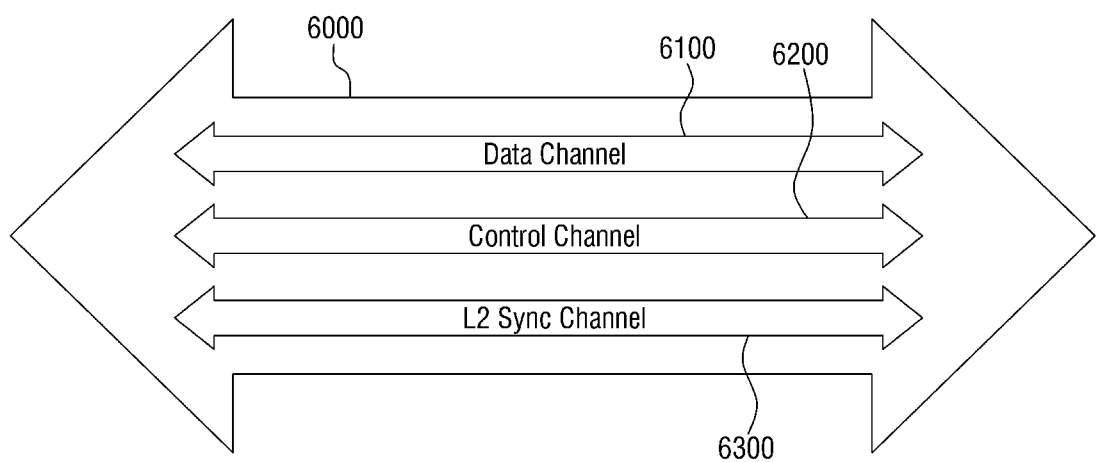
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
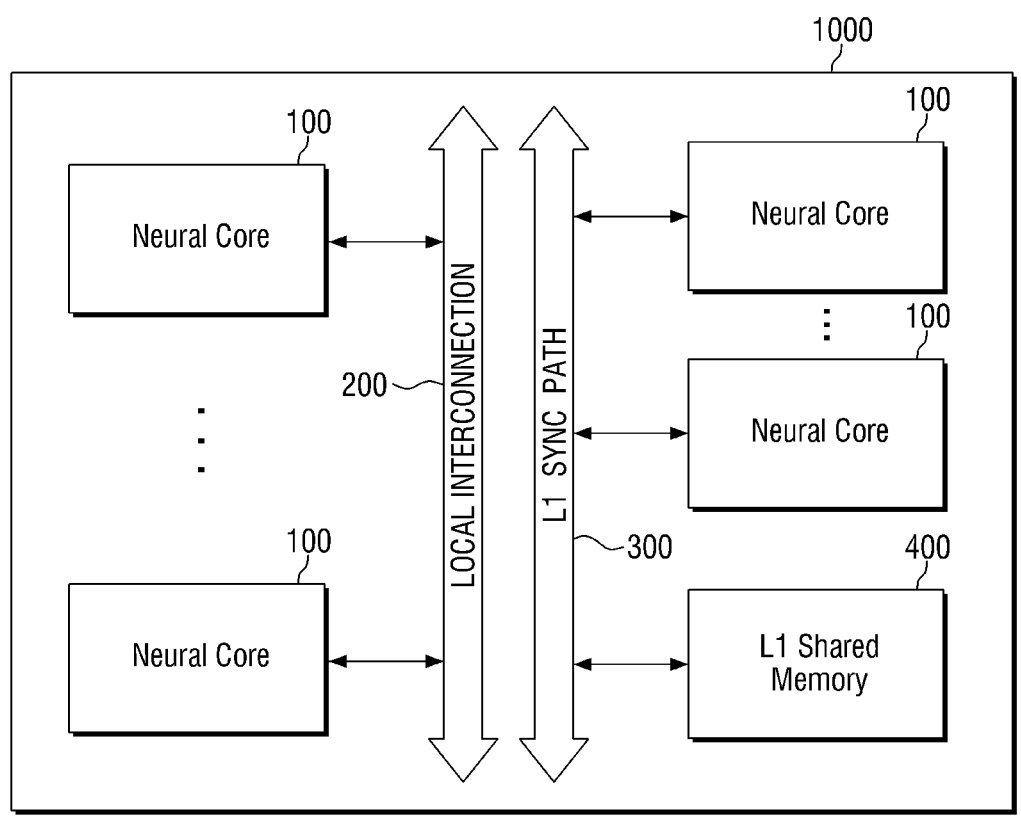
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L1 shared memory 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. That is, the neural processor 1000 may be configured with only one neural core.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The local interconnection 200 may connect the at least one neural core 100 and the L1 shared memory 400 to each other. The local interconnection 200 may be a path through which data travels between the at least one neural core 100 and the L1 shared memory 400. The local interconnection 200 may be connected and transmit data to the global interconnection 6000 of FIG. 3.

The L1 sync path 300 may connect the at least one neural core 100 and the L1 shared memory 400 to each other. The L1 sync path 300 may be a path through which synchronization signals of the at least one neural core 100 and the L1 shared memory 400 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 6:
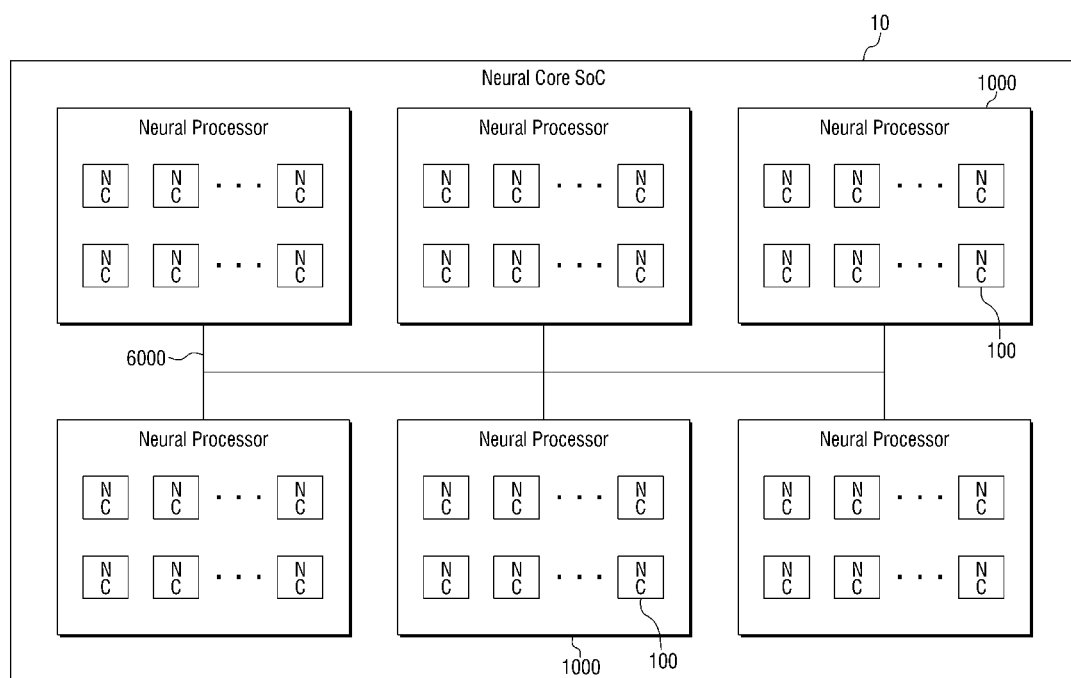
FIG. 6 is a diagram for illustrating a hierarchical structure of a neural processing device in accordance with some embodiments of the disclosure.

FIG. 6 is a diagram for illustrating a hierarchical structure of a neural processing device in accordance with some embodiments of the disclosure.

Referring to FIG. 6, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 7:
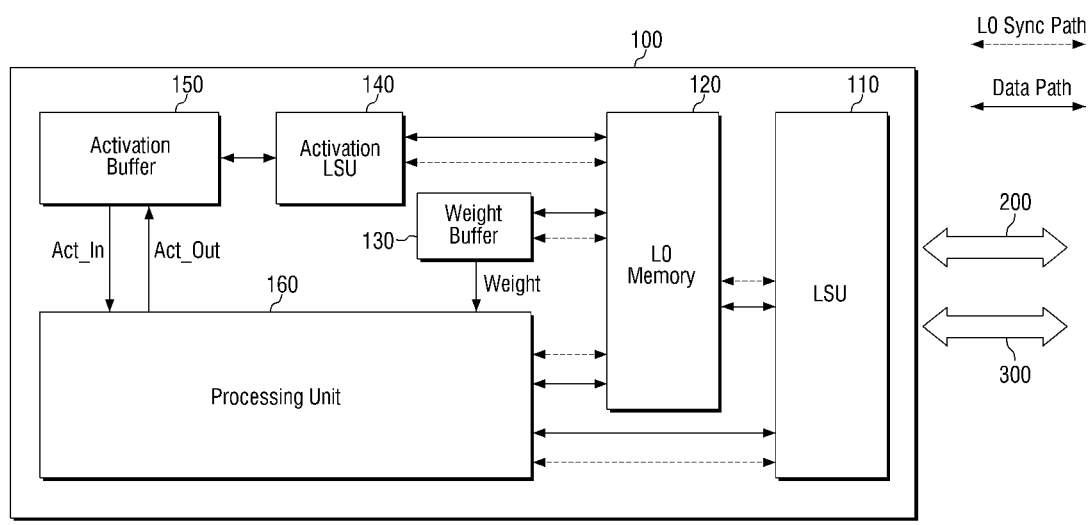
FIG. 7 is a block diagram for illustrating the neural core of FIG. 5 in detail.

FIG. 7 is a block diagram for illustrating the neural core of FIG. 5 in detail.

Referring to FIG. 7, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300.

Figure 8:
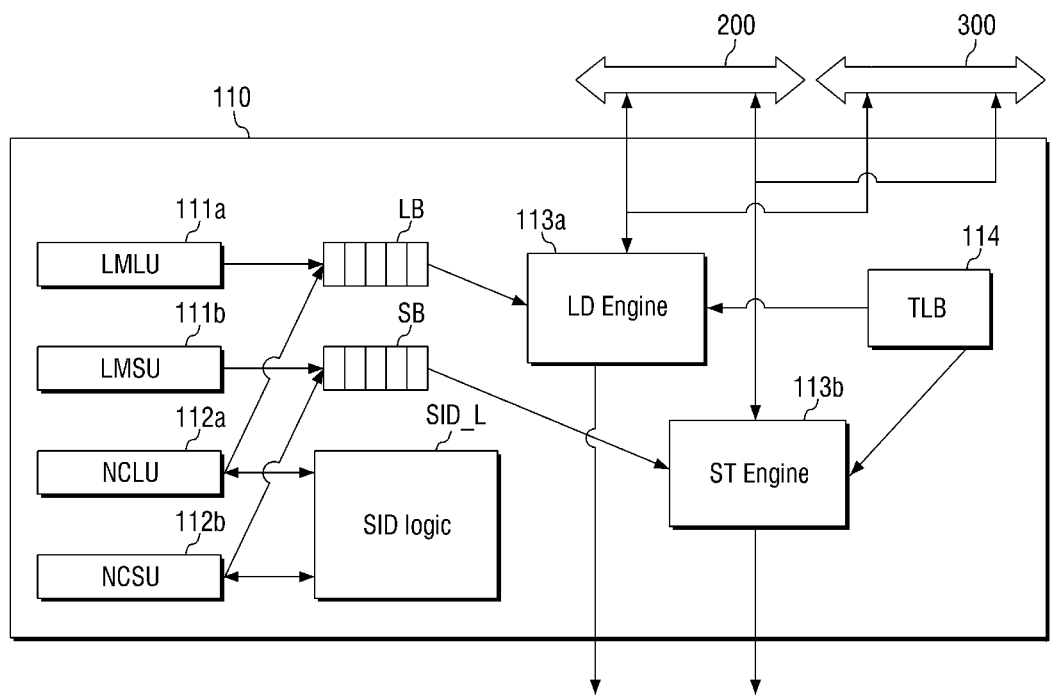
FIG. 8 is a block diagram for illustrating the LSU of FIG. 7 in detail.

FIG. 8 is a block diagram for illustrating the LSU of FIG. 7 in detail.

Referring to FIG. 8, the LSU 110 may include a local memory load unit 111a, a local memory store unit 111b, a neural core load unit 112a, a neural core store unit 112b, a load buffer LB, a store buffer SB, a load engine 113a, a store engine 113b, a translation lookaside buffer 114, and a sync ID logic SID_L.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L1 sync path 300. At this time, the synchronization signal may indicate that the task has been completed.

The sync ID logic SID_L may provide a sync ID to the neural core load unit 112a and the neural core store unit 112b. The sync ID logic SID_L may not provide the sync ID to the local memory load unit 111a and the local memory store unit 111b. However, the embodiment is not limited thereto. In other words, the sync ID logic SID_L may provide the sync ID to the local memory load unit 111a and the local memory store unit 111b as well.

The sync ID may be an ID for identification by each group of load instructions and store instructions. In other words, according to the sync ID, the load instructions and store instructions may be identified by each group.

Figure 9:
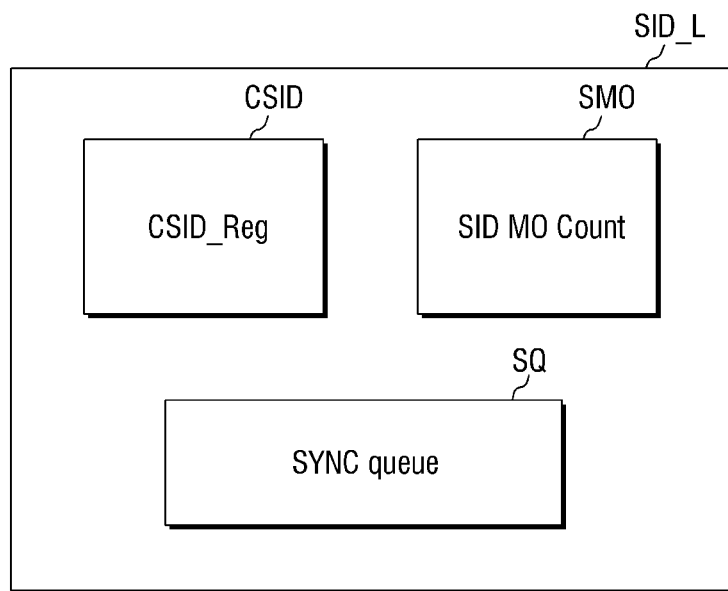
FIG. 9 is a block diagram for illustrating the sync ID logic of FIG. 8 in detail.

FIG. 9 is a block diagram for illustrating the sync ID logic of FIG. 8 in detail.

Referring to FIG. 9, the sync ID logic SID_L may include a current sync ID register CSID, a sync ID MO counter SMO, and a sync queue SQ.

The current sync ID register CSID may store the sync IDs of instructions being issued. In this case, the instructions may include a load instruction and a store instruction.

The instructions may be in the form of a series of streams. Therefore, the instructions may be defined as an instruction stream. The instruction stream may include at least one group. The one group may include an operation instruction and a sync signal for relevant data. In this case, the operation instruction may include a load operation instruction for a load operation and a store operation instruction for a store operation.

The operation instruction may be an instruction for a load operation or a store operation for data. The number of operation instructions may also be one but may be plural. In other words, they may be included so as to continuously perform load or store operations of various data for the necessary calculation tasks.

The sync signal may be a signal indicating that one group is ended. In other words, a plurality of groups of the instruction streams may issue a sync signal at the end of each issue. This may mean that the issue of the group in question is now ended.

Accordingly, the current sync ID register CSID stores the current sync ID, which may be the information on the group that is currently issued.

The sync ID MO counter SMO may count MOs (Maximum Outstandings) for each sync ID. In this case, the MO may refer to the maximum number of requests that one hardware element can transmit in order to prevent the bottleneck phenomenon in the interconnection. In other words, since requests exceeding the preset MO cannot be transmitted to the interconnection, the number of current requests can be counted and controlled. The embodiment can minimize the waiting time for request transmission not by counting the MOs as a whole but by counting the MOs by each sync ID.

The sync queue SQ may be a memory of a FIFO (First In, First Out) structure. The sync queue SQ may receive, store, and sequentially send out at least one group of sync signals. The sync signals outputted from the sync queue SQ may be passed on to the neural core load unit 112a or the neural core store unit 112b. The neural core load unit 112a or the neural core store unit 112b may receive the sync signal and generate a sync-out signal in response thereto. At this time, the sync-out signal may be generated, respectively, according to each group. The sync-out signal may indicate that the operations of a group in question have all ended. In this case, the sync-out signal may refer to the synchronization signal described above. The synchronization signal may be transmitted through an L2 sync channel 6300, an L1 sync path 300, and an L0 sync path. However, the embodiment is not limited thereto.

Figure 10:
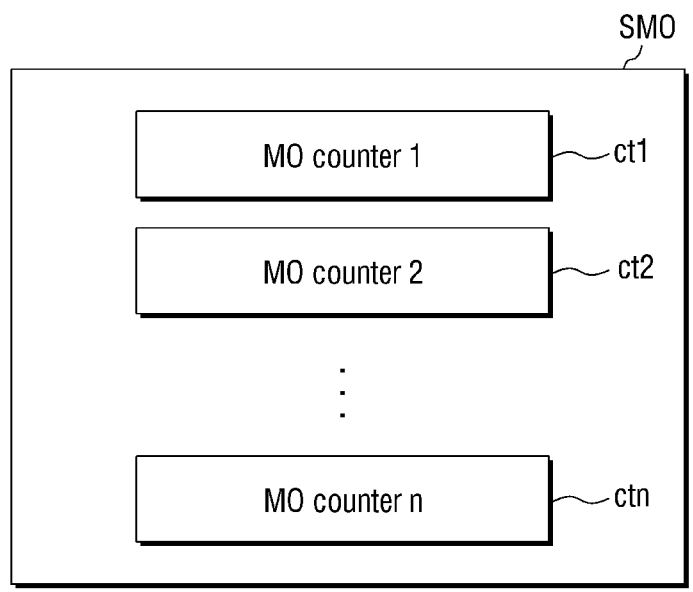
FIG. 10 is a block diagram for illustrating the structure of the sync ID MO counter of FIG. 9 in detail.

FIG. 10 is a block diagram for illustrating the structure of the sync ID MO counter of FIG. 9 in detail.

Referring to FIG. 10, the sync ID MO counter SMO may include a first MO counter ct1, a second MO counter ct2, and an nth MO counter ctn. That is, the sync ID MO counter SMO may include first to nth MO counters ct1 to ctn.

Assuming that the instructions include first to nth groups, the first to nth MO counters ct1 to ctn may correspond to the first to nth groups, respectively. That is, the first MO counter ct1 may count the MOs of the first group, and the second MO counter ct2 may count the MOs of the second group. The nth MO counter ctn may count the MOs of the nth group. In this case, if the instruction is a load instruction, the first to nth groups may be load groups, and if the instruction is a store instruction, the first to nth groups may be store groups.

Figure 11:
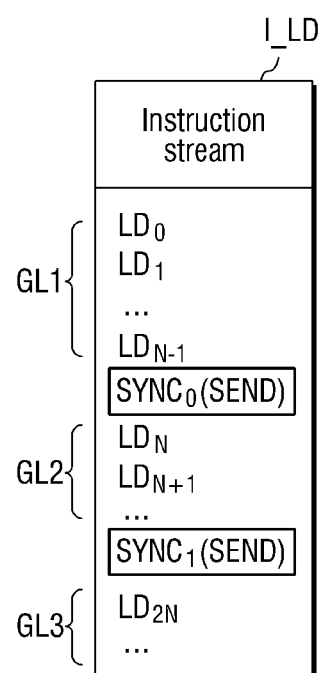
FIG. 11 is a diagram for illustrating a load instruction stream of a neural processing device in accordance with some embodiments of the disclosure.
Figure 12:
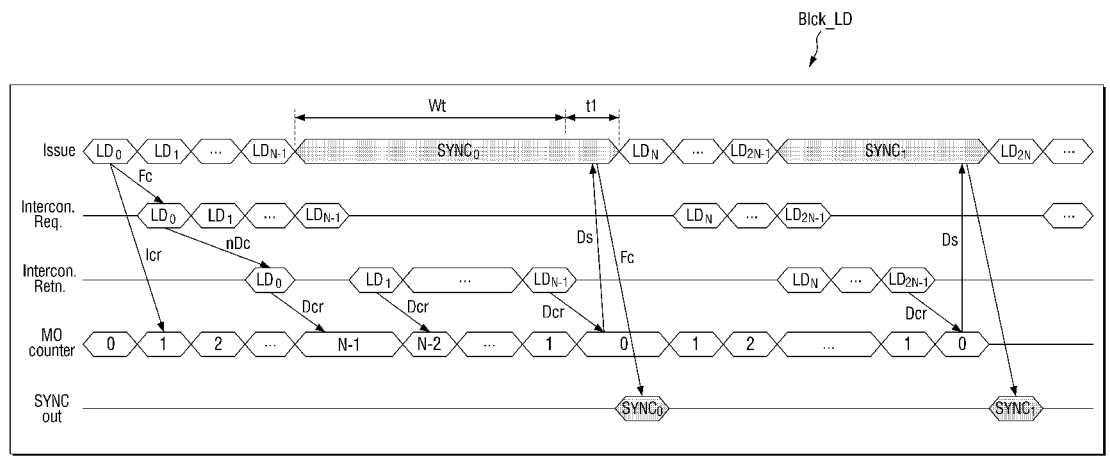
FIG. 12 is a time diagram for illustrating an operation of blocking a load sync signal.

FIG. 11 is a diagram for illustrating a load instruction stream of a neural processing device in accordance with some embodiments of the disclosure, and FIG. 12 is a time diagram for illustrating an operation of blocking a load sync signal.

Referring to FIGS. 11 and 12, the load instruction stream I_LD may include at least one operation instruction, i.e., load instructions LD0 to LD2N. In this case, the load instructions LD0 to LD2N may have a plurality of load groups GL1 to GL3, and each load group GL1 to GL3 may bundle related load instructions. That is, in FIG. 11, the load instructions LD0 to LDN-1 are the first load group GL1, and the other load groups GL2 and GL3 may also include a plurality of load instructions in sequence. Although FIG. 11 illustrates only three load groups, the embodiment is not limited thereto.

Sync signals SYNC0(SEND) and SYNC1(SEND) may indicate the end of each load group GL1 to GL3. In other words, the end of each load group may be indicated by the sync signals SYNC0(SEND) and SYNC1(SEND). The sync signals SYNC0(SEND) and SYNC1(SEND) may define an issue unit of operation instructions.

At this time, in general, the operation instructions are not issued continuously but are issued in a particular number as in FIG. 12, and when the returns of those operation instructions are returned, the next operation instructions can be executed, thereby preventing the operation delays.

In other words, in general, requests are transmitted to the interconnection according to the issue of the operation instructions, and if the number of these requests is not limited, the interconnection would be paralyzed and the speed of the entire device may be reduced. Therefore, if a particular number of operation instructions are issued, the next operation instructions may be issued again after receiving all the returns in response thereto. The sync signals SYNC0(SEND) and SYNC1(SEND) may define the unit of these operation instructions that are issued continuously.

In another aspect, operation instructions for a particular task may all be related to one another and may be executed continuously. These may have dependencies with other tasks and may thus have to be executed first. Therefore, these related operation instructions may form one group and be issued continuously, and may be executed first before the next issue through the sync signals SYNC0(SEND) and SYNC1(SEND).

Specifically, referring to FIGS. 10 to 12, instructions may be fetched and issued by each load group for the load instructions. The first load group GL1 may be load instructions LD0 to LDN-1 in FIG. 12. Further, subsequent load instructions may be included in the second load group GL2 and the third load group GL3 in sequence.

At this time, a delay may occur by an amount of a preset clock cycle after the issue, and an interconnection request Intercon. Req. may be transmitted via the local interconnection 200. In this case, the delay may be a preset fixed cycle Fc.

The issue of the sync signal SYNC0 for the first load group GL1 may not be immediately ended, but may be ended when the interconnection returns Intercon. Retn., which are responses to the interconnection request Intercon. Req., have all been received.

The interconnection return Intercon. Retn. may be received via the local interconnection 200. The interconnection return Intercon. Retn. may cause a delay by an amount of a non-fixed cycle Fc that is not preset from the interconnection request Intercon. Req.

In this case, the MO counter may perform counting regardless of the group. The counting may be performed by an increment signal Icr that increases when a load instruction is issued and a decrement signal Dcr that decreases when an interconnection return Intercon. Retn. is received. In other words, the MO counter may increase by 1 when a load instruction is issued, and the MO counter may decrease by 1 when an interconnection return Intercon. Retn. is received.

Accordingly, when the MO counter finally becomes 0, the responses to the load instructions of the first load group GL1, i.e., the interconnection returns Intercon. Retn., are all received and thus, the MO counter may transmit a completion signal Ds, and accordingly, the issue of the sync signal SYNC0 for the first load group GL1 may be ended. In this case, a sync-out signal may be issued after the fixed cycle Fc.

Accordingly, the sync signal SYNC0 for the first load group GL1 may cause an additional waiting time Wt in addition to a first time t1 that is an actual delay at which the actual MO counter becomes 0 and the sync-out signal is issued by the fixed cycle. Such an additional waiting time may be caused by a method of blocking new issues until the returns of the first load group GL1 have all arrived.

Figure 13:
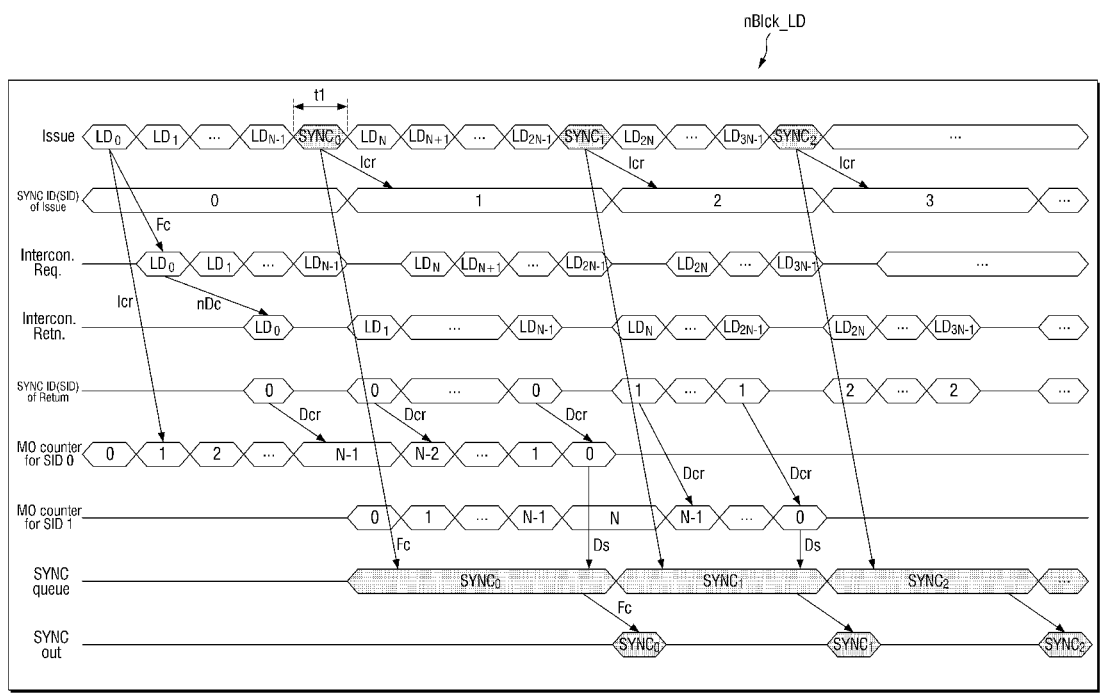
FIG. 13 is a time diagram for illustrating an operation of non-blocking of a load synchronization signal of a neural processing device in accordance with some embodiments of the disclosure.

FIG. 13 is a time diagram for illustrating an operation of non-blocking of a load synchronization signal of a neural processing device in accordance with some embodiments of the disclosure.

Referring to FIGS. 9 to 11 and 13, load instructions may be issued in a non-blocking manner, unlike FIG. 12.

First, the issue of operation instructions, i.e., load instructions, may be performed in the same manner as in FIG. 12. In FIG. 12, the load instructions LD0 to LDN-1 may form the first load group GL1, and the load instructions LDN to LD2N-1 may form the second group.

If the load instructions LD0 to LDN-1 of the first load group GL1 are issued, a sync ID 0 may be issued SYNC ID (SID) of Issue. The sync ID may be stored in the current sync ID register CSID. When the sync signal SYNC0 of the first load group GL1 is issued later, the increment signal Icr is generated and the sync ID may increase by 1.

An interconnection request Intercon. Req. may be generated after a delay of an amount of a fixed cycle Fc for each of the load instructions LD0 to LDN-1 of the first load group GL1. The interconnection request Intercon. Req. may be transmitted via the local interconnection 200. The interconnection request Intercon. Req. may be transmitted via the local interconnection 200, the global interconnection 6000, and the first volatile memory interface 50.

An interconnection return Intercon. Retn. may be returned in response to the interconnection request Intercon. Req. The timing at which the interconnection return Intercon. Retn. is returned may vary depending on various factors, such as the state of the interconnection, and the location and state of the response element. Therefore, the interconnection return Intercon. Retn. may be returned after a time of an amount of a non-fixed cycle Fc that is not predetermined is elapsed from the interconnection request Intercon. Req.

A sync ID return SYNC ID (SID) of Return may be generated for such an interconnection return Intercon. Retn. The sync ID return may be generated at the same time as the reception of the interconnection return Intercon. Retn.

The first MO counter ct1 may count the number each time the load instructions LD0 to LDN−1 of the first load group GL1 are issued. In other words, whenever each of the load instructions LD0 to LDN−1 of the first load group GL1 is issued, it may be increased by 1 by means of the increment signal Icr. Conversely, the first MO counter ct1 may be increased by 1 by means of the decrement signal Dcr each time a sync ID return for the first load group GL1 is generated. Therefore, when the interconnection returns Intercon. Retn. for the load instructions LD0 to LDN−1 of the first load group GL1 have all arrived, the first MO counter ct1 may be 0.

The second MO counter ct2 may count the number each time the load instructions LDN to LD2N−1 of the second group are issued. In other words, whenever each of the load instructions LDN to LD2N−1 of the second group is issued, it may be increased by 1 by means of the increment signal Icr. Conversely, the second MO counter ct2 may be increased by 2 by means of the decrement signal Dcr each time a sync ID return for the second group is generated. Therefore, when the interconnection returns Intercon. Retn. for the load instructions LDN to LD2N−1 of the second group have all arrived, the second MO counter ct2 may be 0.

The SYNC queue may be a signal stored in the sync queue SQ. The SYNC queue may store the sync signals SYNC0, SYNC1, and SYNC2 in sequence according to the issue of the sync signals SYNC0, SYNC1, and SYNC2.

The issue of the sync signals SYNC0, SYNC1, and SYNC2 and the storage of the SYNC queue may be made with a delay of an amount of a preset fixed cycle Fc. The sync signal SYNC0 for the first load group GL1 stored in the sync queue SQ may be converted into the sync signal SYNC1 for the second group by the issue of the completion signal Ds generated when the first MO counter ct1 becomes 0 and the sync signal SYNC1 for the second group. In other words, only when both the reception of the completion signal Ds and the issue of the sync signal SYNC1 for the second group are satisfied, it may be converted into the sync signal SYNC1 for the second group. When the sync queue SQ is converted, the sync-out signals SYNC0, SYNC1, and SYNC2 may be generated after the fixed cycle Fc.

The issue of the sync signals SYNC0, SYNC1, and SYNC2 of the embodiment may need only the required first time t1, but may not need an additional waiting time. This may be due to the fact that a sync ID is generated for each group, and each MO counter exists separately for each sync ID.

In other words, the issue of the load instructions may proceed even before the first load group GL1 all receives the interconnection returns Intercon. Retn. Nevertheless, since completion is checked for each one in parallel at separate MO counters, each instruction can be executed sequentially without any problem. Accordingly, the additional waiting time Wt required in FIG. 12 may not be required at all by the non-blocking operation in the embodiment. Accordingly, the overall speed and performance of the device can be greatly improved.

Figure 14:
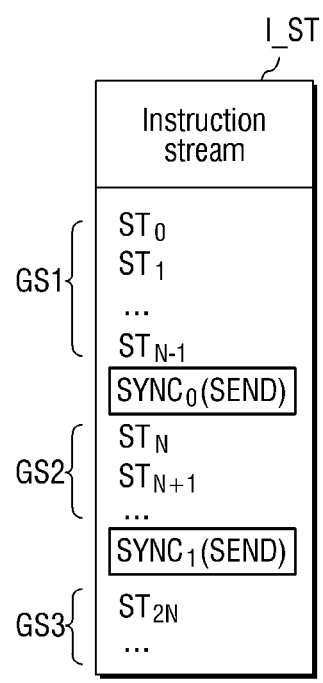
FIG. 14 is a diagram for illustrating a store instruction stream of a neural processing device in accordance with some embodiments of the disclosure.

FIG. 14 is a diagram for illustrating a store instruction stream of a neural processing device in accordance with some embodiments of the disclosure.

Referring to FIG. 14, the store instruction stream I_ST may include at least one operation instruction, i.e., store instructions ST0 to ST2N. In this case, the store instructions ST0 to ST2N may have a plurality of groups, and each group may bundle related store instructions. That is, in FIG. 14, the store instructions ST0 to STN−1 may be one group.

Sync signals SYNC0(SEND) and SYNC1(SEND) may indicate the end of one group in the same way as the load instructions. In other words, the sync signals SYNC0 (SEND) and SYNC1(SEND) may define an issue unit of operation instructions.

Figure 15:
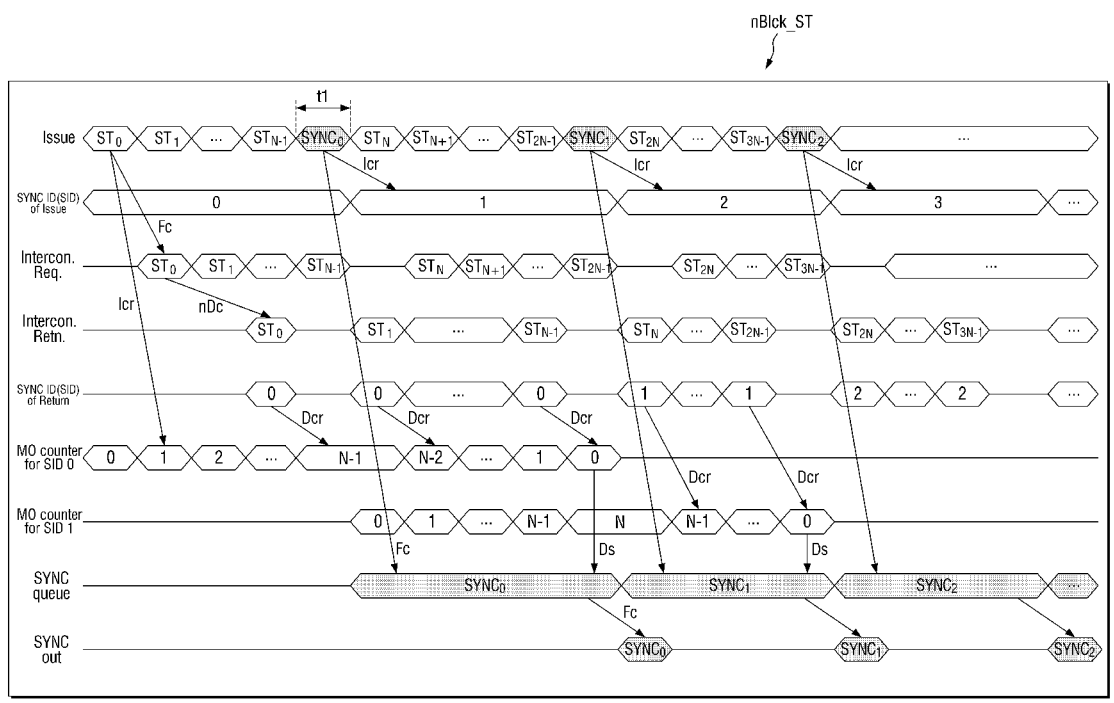
FIG. 15 is a time diagram for illustrating an operation of non-blocking of a store synchronization signal of a neural processing device in accordance with some embodiments of the disclosure.

FIG. 15 is a time diagram for illustrating an operation of non-blocking of a store synchronization signal of a neural processing device in accordance with some embodiments of the disclosure.

Referring to FIGS. 9 to 11 and 15, store instructions may be issued in a non-blocking manner, unlike FIG. 12.

First, the issue of operation instructions, i.e., store instructions, may be performed in the same manner as in FIG. 12. If the store instructions ST0 to STN−1 of the first store group GS1 are issued, a sync ID 0 may be issued SYNC ID (SID) of Issue. The sync ID may be stored in the current sync ID register CSID. When the sync signal SYNC0 of the first store group GS1 is issued later, an increment signal Icr is generated and the sync ID may increase by 1.

An interconnection request Intercon. Req. may be generated after a delay of an amount of a fixed cycle Fc for each of the store instructions ST0 to STN−1 of the first store group GS1. The interconnection request Intercon. Req. may be transmitted via the local interconnection 200. The interconnection request Intercon. Req. may be transmitted via the local interconnection 200, the global interconnection 6000, and the first volatile memory interface 50.

An interconnection return Intercon. Retn. may be returned in response to the interconnection request Intercon. Req. The timing at which the interconnection return Intercon. Retn. is returned may vary depending on various factors, such as the state of the interconnection, and the location and state of the response element. Therefore, the interconnection return Intercon. Retn. may be returned after a time of an amount of a non-fixed cycle Fc that is not predetermined is elapsed from the interconnection request Intercon. Req.

A sync ID return SYNC ID (SID) of Return may be generated for such an interconnection return Intercon. Retn. The sync ID return may be generated at the same time as the reception of the interconnection return Intercon. Retn.

The first MO counter ct1 may count the number each time the store instructions ST0 to STN−1 of the first store group GS1 are issued. In other words, whenever each of the store instructions ST0 to STN−1 of the first store group GS1 is issued, it may be increased by 1 by means of the increment signal Icr. Conversely, the first MO counter ct1 may be increased by 1 by means of the decrement signal Dcr each time a sync ID return for the first store group GS1 is generated. Therefore, when the interconnection returns Intercon. Retn. for the load instructions LD0 to LDN−1 of the first store group GS1 have all arrived, the first MO counter ct1 may be 0.

The second MO counter ct2 may count the number each time the store instructions STN to ST2N−1 of the second group are issued. In other words, whenever each of the store instructions STN to ST2N−1 of the second group is issued, it may be increased by 1 by means of the increment signal Icr. Conversely, the second MO counter ct2 may be increased by 2 by means of the decrement signal Dcr each time a sync ID return for the second group is generated. Therefore, when the interconnection returns Intercon. Retn.

for the store instructions STN to ST2N−1 of the second group have all arrived, the second MO counter ct2 may be 0.

The SYNC queue may be a signal stored in the sync queue SQ. The SYNC queue may store the sync signals SYNC0, SYNC1, and SYNC2 in sequence according to the issue of the sync signals SYNC0, SYNC1, and SYNC2.

The issue of the sync signals SYNC0, SYNC1, and SYNC2 and the storage of the SYNC queue may be made with a delay of an amount of a preset fixed cycle Fc. The sync signal SYNC0 for the first store group GS1 stored in the sync queue SQ may be converted into the sync signal SYNC1 for the second group by the issue of the completion signal Ds generated when the first MO counter ct1 becomes 0 and the sync signal SYNC1 for the second group. In other words, only when both the reception of the completion signal Ds and the issue of the sync signal SYNC1 for the second group are satisfied, it may be converted into the sync signal SYNC1 for the second group. When the sync queue SQ is converted, the sync-out signals SYNC0, SYNC1, and SYNC2 may be generated after the fixed cycle Fc.

In other words, the embodiment may require only a delay of a first time t1 without an additional waiting time Wt for the store operations too as in the case of the load operations. Therefore, the waiting time due to the load/store operations can be minimized, and thus overall data transmission efficiency can be improved.

Figure 16:
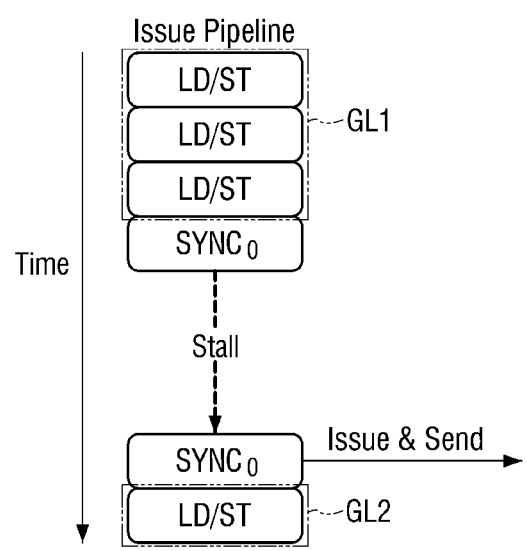
FIG. 16 is a conceptual diagram for illustrating a waiting time in the case of an in-order execution pipeline.
Figure 17:
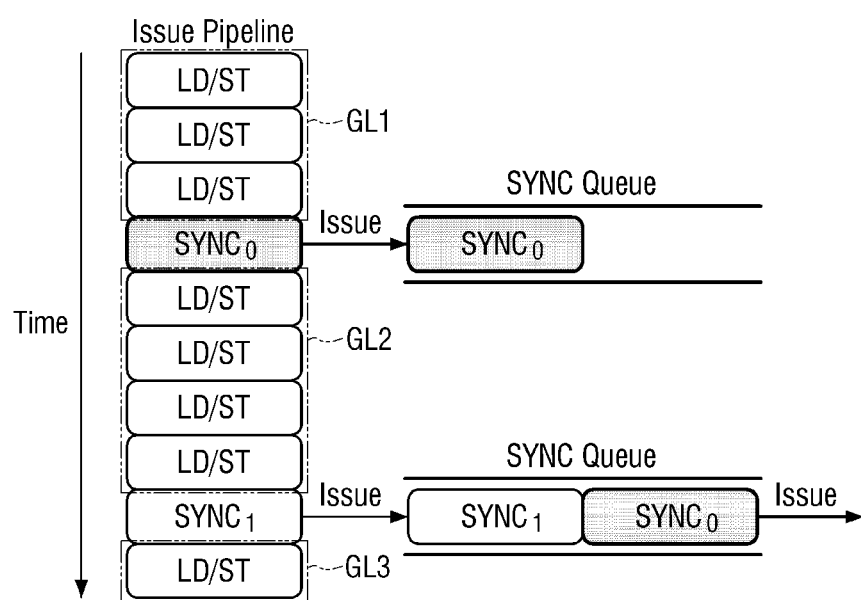
FIG. 17 is a conceptual diagram for illustrating a waiting time in an in-order execution pipeline of a neural processing device in accordance with some embodiments of the disclosure.

FIG. 16 is a conceptual diagram for illustrating a waiting time in the case of an in-order execution pipeline, and FIG. 17 is a conceptual diagram for illustrating a waiting time in an in-order execution pipeline of a neural processing device in accordance with some embodiments of the disclosure.

Referring to FIG. 16, in general, when proceeding with a blocking operation, a stall may occur as in FIG. 16. In other words, when there is one issue pipeline, each load/store operation may proceed with one dependency chain. That is, since each load/store operation must satisfy the temporal sequence, a waiting time is required until the load/store operations of the first load group GL1 are completed, and the sync-out signal SYNC0 may be issued and sent after the waiting. In other words, the issue of the sync signal and the transmission of the sync-out signal may require an additional waiting time Wt as in FIG. 12. Subsequently, the issue of the instructions of the second group may proceed.

On the contrary, referring to FIG. 17, the issue of the load/store instructions of the second group immediately following the issue of the sync signal SYNC0 of the first load group GL1 may be executed with a minimum delay in the embodiment. Instead, the sync signal SYNC0 of the first load group GL1 may be stored as the sync queue SQ before being directly sent as the sync-out signal.

Subsequently, the sync signal SYNC1 of the second load group GL2 may be stored in the sync queue SQ. Subsequently, if the interconnection returns of the first load group GL1 are all completed, the sync signal SYNC0 of the first load group GL1 that has been in the sync queue SQ may be issued as a sync-out signal. As such, an additional time may be required between the issue of the sync signal SYNC0 and the issue of the sync-out signal of the same group. In this case, the sync queue SQ is of a FIFO structure, and the sync signal SYNC0 of the first load group GL1, which has been issued first, may go out first as a sync-out signal.

However, since the issue of the load/store instructions continues without interruption between them, the maximum transmission efficiency can be obtained without any section in which the interconnection does not operate as a whole.

Figure 18:
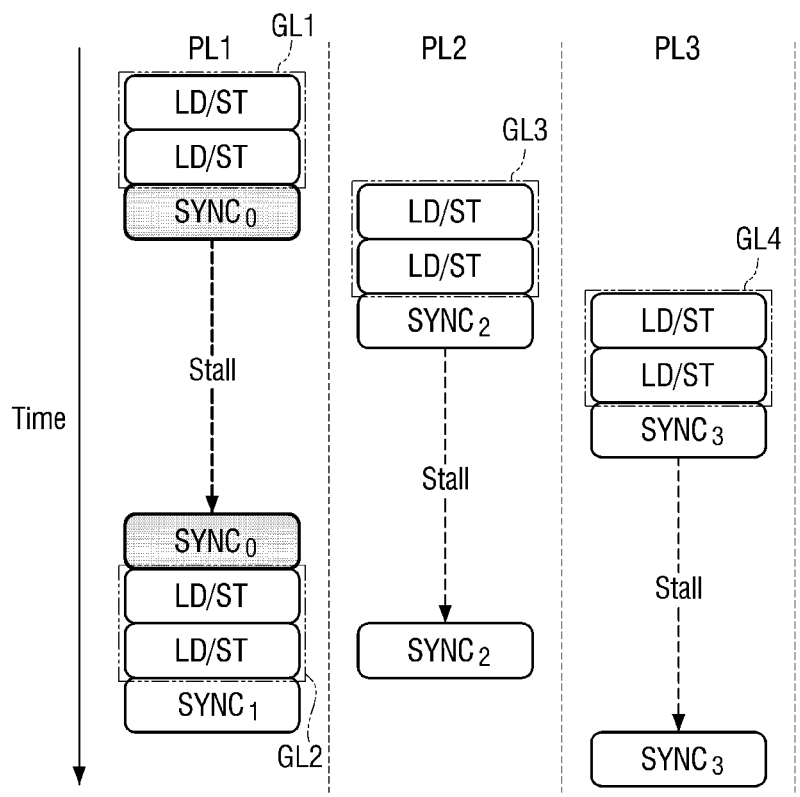
FIG. 18 is a conceptual diagram for illustrating a waiting time in the case of an out-of-order execution pipeline.
Figure 19:
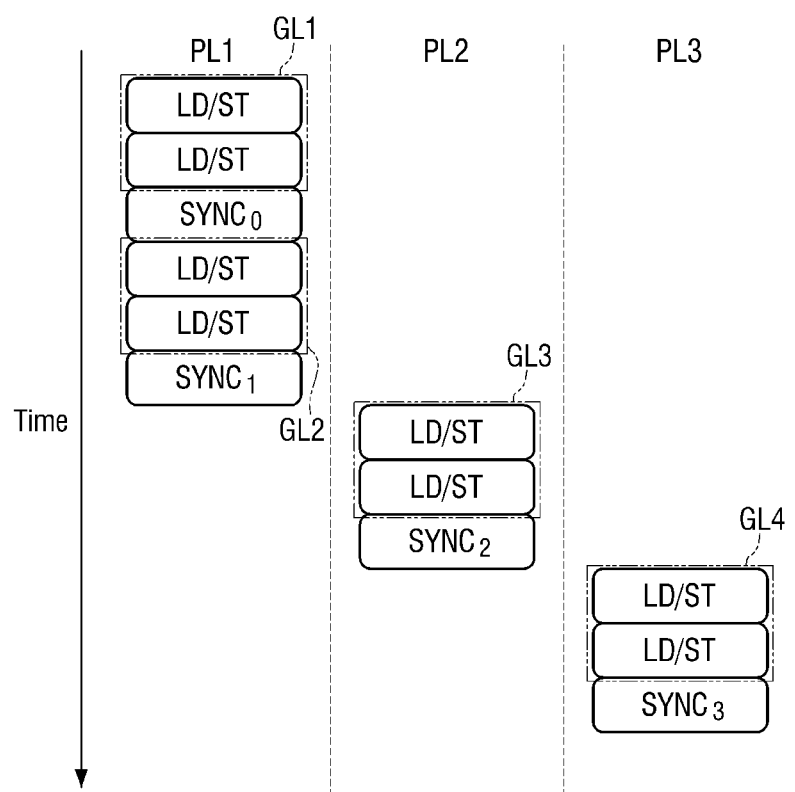
FIG. 19 is a conceptual diagram for illustrating a waiting time in an out-of-order execution pipeline of a neural processing device in accordance with some embodiments of the disclosure.

FIG. 18 is a conceptual diagram for illustrating a waiting time in the case of an out-of-order execution pipeline, and FIG. 19 is a conceptual diagram for illustrating a waiting time in an out-of-order execution pipeline of a neural processing device in accordance with some embodiments of the disclosure Referring to FIG. 18, a case may be assumed in which the load/store instructions of the first load group GL1 and the second load group GL2 have a dependency on each other, and there is no dependency in the case of the third load group GL3 and the fourth load group GL4. In this case, the issue of the instructions of the first load group GL1 and the second load group GL2 should proceed in order, but the issue of the third load group GL3 and the fourth load group GL4 does not require such an order.

Therefore, according to the blocking operation, in the first issue pipeline PL1, an additional waiting time Wt may occur between the issue of the sync signal of the first load group GL1 and the transmission of the sync-out signal of the first load group GL1 as in FIG. 12, and subsequently, an instruction issue of the second load group GL2 may be performed.

In the second issue pipeline PL2, when the sync signal SYNC0 of the first load group GL1 is issued without additional waiting, the issue of the load/store instructions of the third load group GL3 may be executed immediately. However, the issue of the third load group GL3 itself may require an additional waiting time. Similarly, in the third issue pipeline PL3, when the sync signal SYNC2 of the third load group GL3 is issued without additional waiting, the issue of the load/store instructions of the fourth load group GL4 may be executed immediately. However, the issue of the fourth load group GL4 itself may require an additional waiting time, and after that, the sync signal SYNC3 of the fourth load group GL4 may be issued.

If the out-of-order execution is made in this way, there may be an effect that the waiting times overlap with each other, and thus, are slightly reduced as compared with the in-order execution. However, depending on the number of pipelines and the dependency status, there may exist a waiting time, and hardware optimization cannot be performed.

On the contrary, referring to FIG. 19, since none of the first issue pipeline PL1, the second issue pipeline PL2, and the third issue pipeline PL3 requires a waiting time in the embodiment, sequential processing can be performed in the same manner as the in-order execution. In other words, the sync signal SYNC0 of the first load group GL1 and the sync signal SYNC1 of the second load group GL2 may be issued in sequence in the first issue pipeline PL1. Subsequently, the sync signal SYNC2 of the third load group GL3 may be issued in the second issue pipeline PL2, and subsequently, the sync signal SYNC3 of the fourth load group GL4 may be issued in the third issue pipeline PL3.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the neural core level, i.e., level 0 (L0). Therefore, the L0 memory 120 may also be defined as an L0 memory. However, the L0 memory may not be shared but be a private memory of the neural core, unlike the L1 shared memory 400 and the L2 shared memory, i.e., the shared memory 2000.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 20:
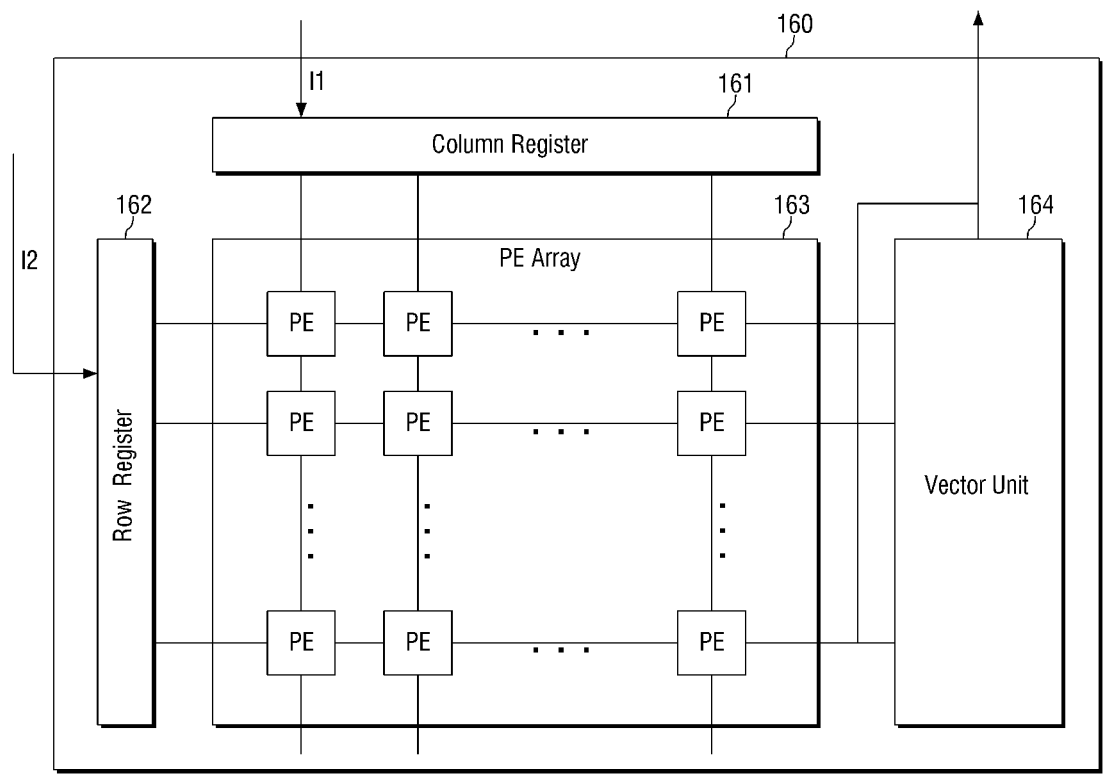
FIG. 20 is a block diagram for illustrating the processing unit of FIG. 7.

FIG. 20 is a block diagram for illustrating the processing unit of FIG. 7 in detail.

Referring to FIG. 7 and FIG. 20, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 21:
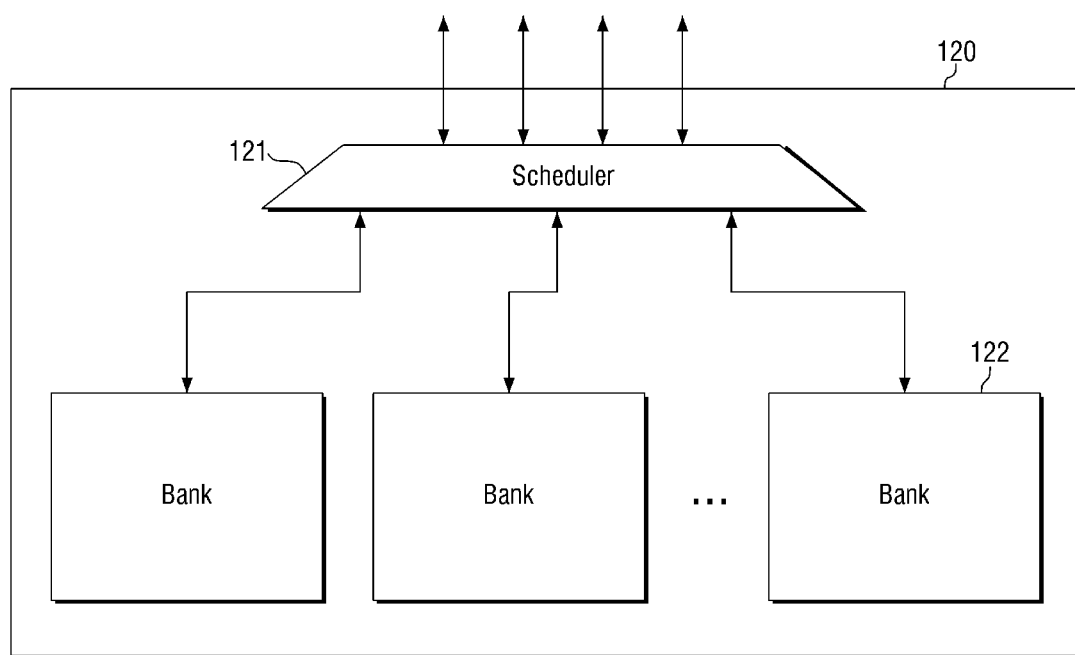
FIG. 21 is a block diagram for illustrating the L0 memory of FIG. 20 in detail.

FIG. 21 is a block diagram for illustrating the L0 memory of FIG. 7 in detail.

Referring to FIG. 21, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200.

Figure 22:
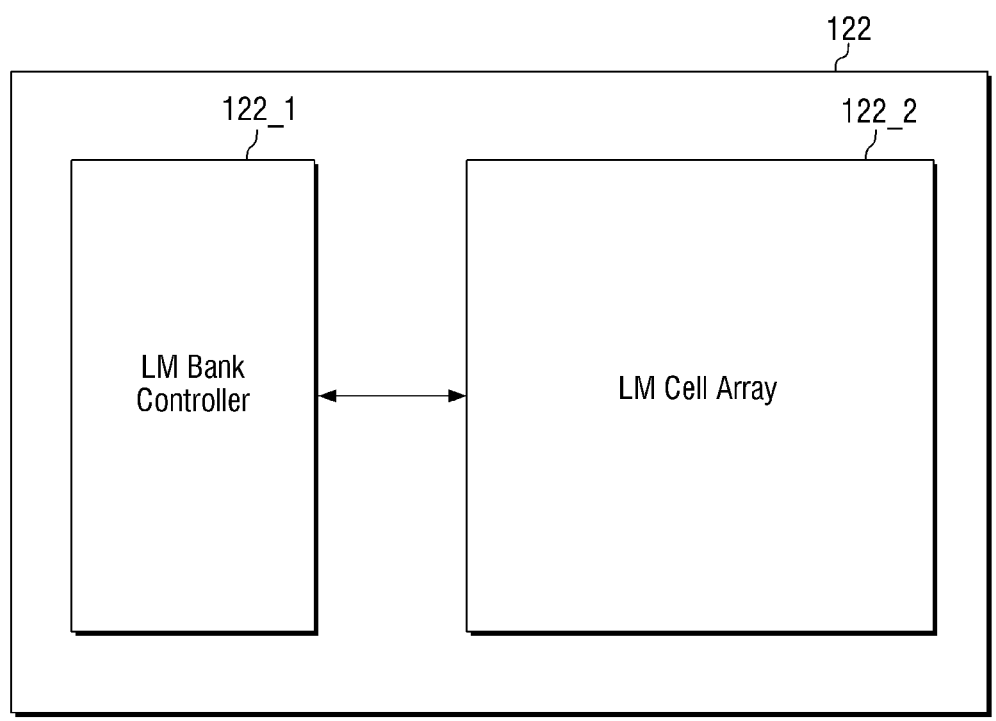
FIG. 22 is a block diagram for illustrating the local memory bank of FIG. 21.

FIG. 22 is a block diagram for illustrating the local memory bank of FIG. 21 in detail.

Referring to FIG. 22, the local memory bank 122 may include a local memory bank controller 122_1 and a local memory bank cell array 122_2.

The local memory bank controller 1221 may manage read and write operations via the addresses of data stored in the local memory bank 122. In other words, the local memory bank controller 122_1 may manage the input/output of data as a whole.

The local memory bank cell array 1222 may be of a structure in which cells in which data is directly stored are arranged in rows and columns. The local memory bank cell array 122_2 may be controlled by the local memory bank controller 122_1.

Figure 23:
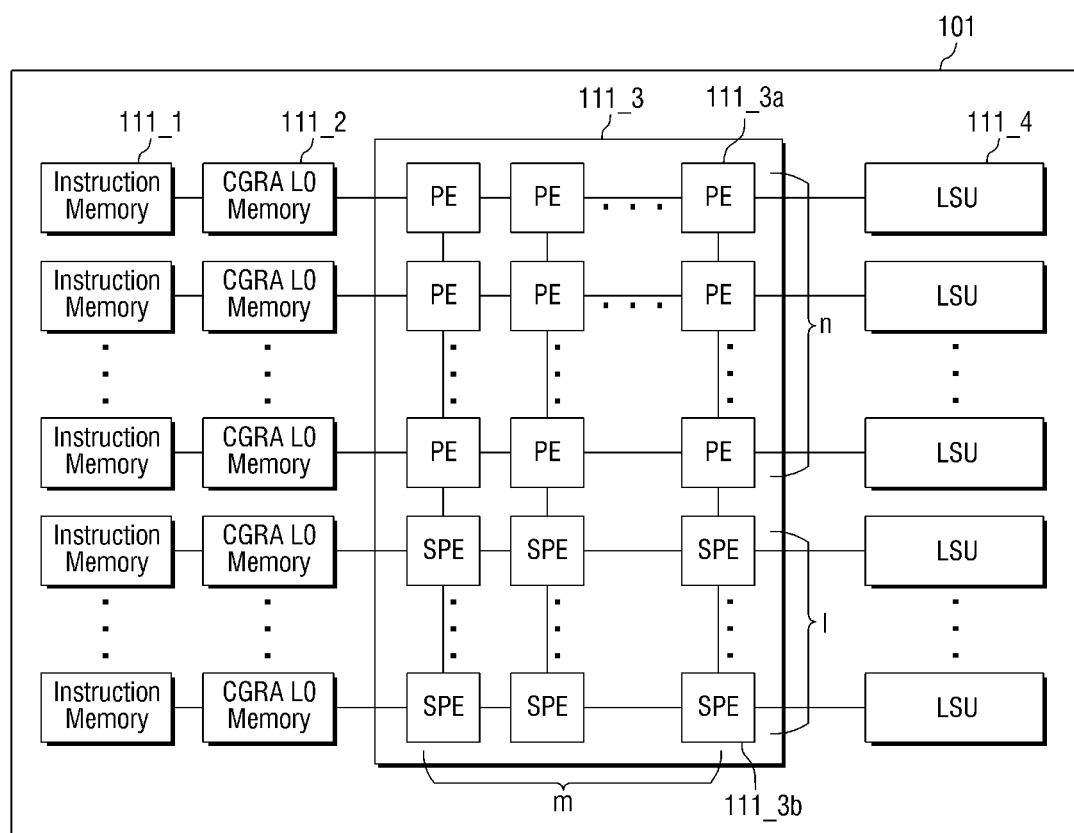
FIG. 23 is a block diagram for illustrating the structure of the neural processing device of FIG. 1 in detail.

FIG. 23 is a block diagram for illustrating in detail the structure of a neural processing device in accordance with some embodiments of the disclosure.

Referring to FIG. 23, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 1111 may sequentially store instructions internally, and provide the stored instructions to the PE array 111_3. In this case, the instructions may instruct the operation of the processing element 111_3a included in each PE array 1113.

The CGRA L0 memory 111_2 is a memory located inside the neural core 101, and may receive all the input data required for the tasks by the neural core 101 from the outside and temporarily store them. Further, the CGRA L0 memory 1112 may temporarily store the output data calculated by the neural core 101 in order to transmit them to the outside. The CGRA L0 memory 1112 may serve as a cache memory of the neural core 101.

The CGRA L0 memory 1112 may send and receive data to and from the PE array 111_3. The CGRA L0 memory 1112 may be a memory corresponding to L0 (level 0) lower than L1. In this case, the CGRA L0 memory 1112 may be a private memory of the neural core 101 that is not shared, unlike the L1 shared memory 400 or the L2 shared memory i.e., the shared memory 2000. The CGRA L0 memory 1112 may transmit data such as activations or weights, programs, and the like to the PE array 111_3.

The PE array 1113 may be a module that performs calculations. The PE array 1113 may perform not only one-dimensional calculations but also two-dimensional or higher matrix/tensor calculations. The PE array 1113 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in l rows. Accordingly, the processing elements 111_3a and the particular processing elements 111_3b may be arranged in (n+1) rows and m columns.

The LSU 111_4 may receive at least one of data, a control signal, or a synchronization signal from the outside via the L0 interconnection. The LSU 1114 may transmit at least one of the received data, control signal, or synchronization signal to the CGRA L0 memory 111_2. Similarly, the LSU 1114 may transmit at least one of the data, control signal, or synchronization signal to the outside via the L0 interconnection.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, or the LSU 111_4, respectively. In other words, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 of the disclosure having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may also be possible.

For example, if the processing elements 111_3a are processing elements that perform two-dimensional calculations, the particular processing elements 111_3b may be processing elements that perform one-dimensional calculations. However, the embodiment is not limited thereto.

Figure 24:
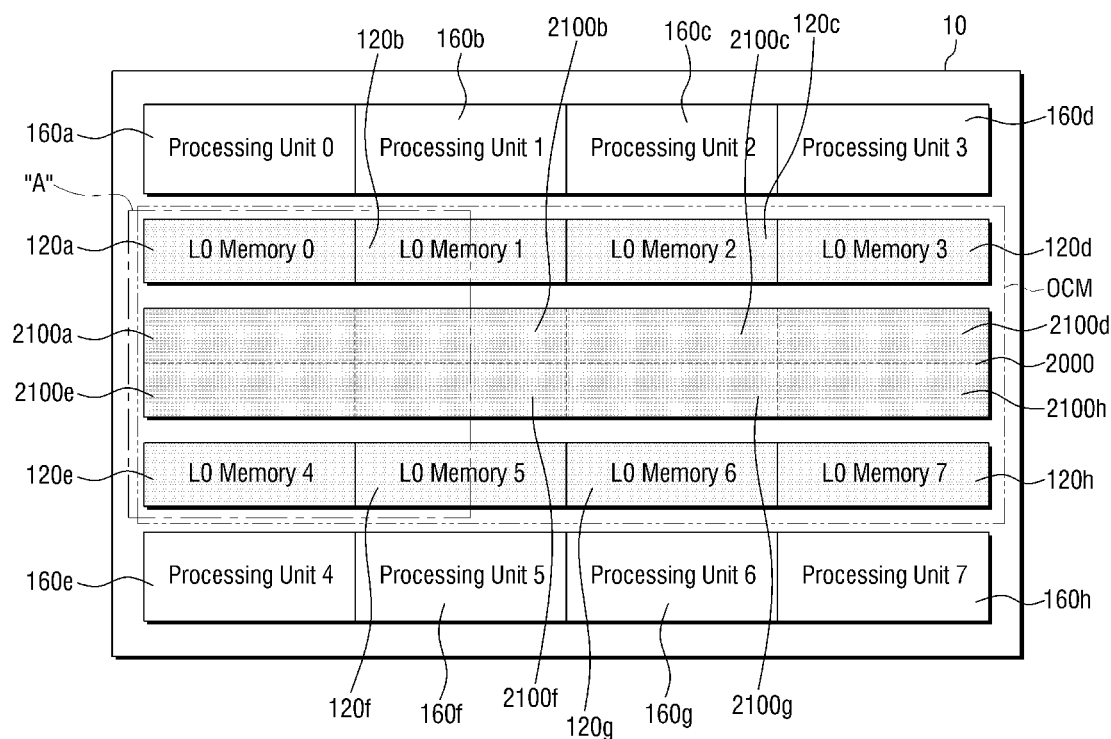
FIG. 24 is a block diagram for illustrating the memory reconstruction of the neural processing system of FIG. 1.

FIG. 24 is a block diagram for illustrating memory reconfiguration of a neural processing system in accordance with some embodiments of the disclosure.

Referring to FIG. 24, the neural core SoC 10 may include first to eighth processing units 160a to 160h and an on-chip memory OCM. Although FIG. 24 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 25:
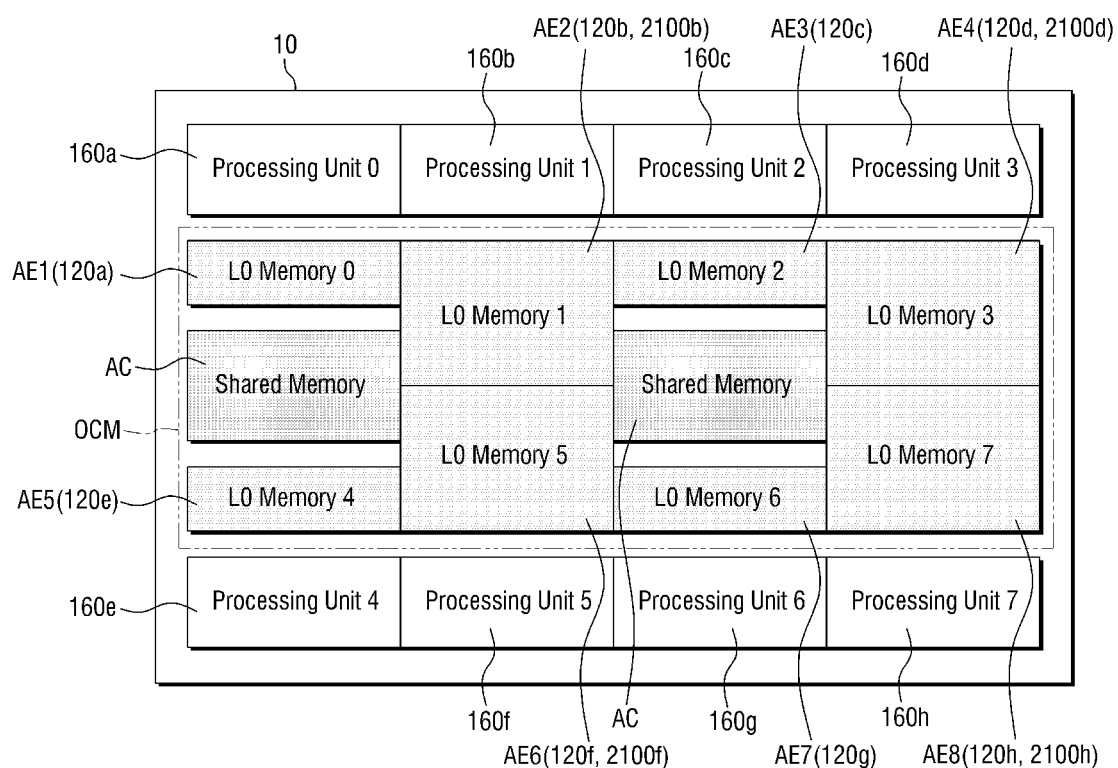
FIG. 25 is a block diagram showing an example of the memory reconstruction of the neural processing system of FIG. 1.

FIG. 25 is a block diagram showing an example of memory reconstruction of a neural processing system in accordance with some embodiments of the disclosure.

With reference to FIGS. 24 and 25, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 26:
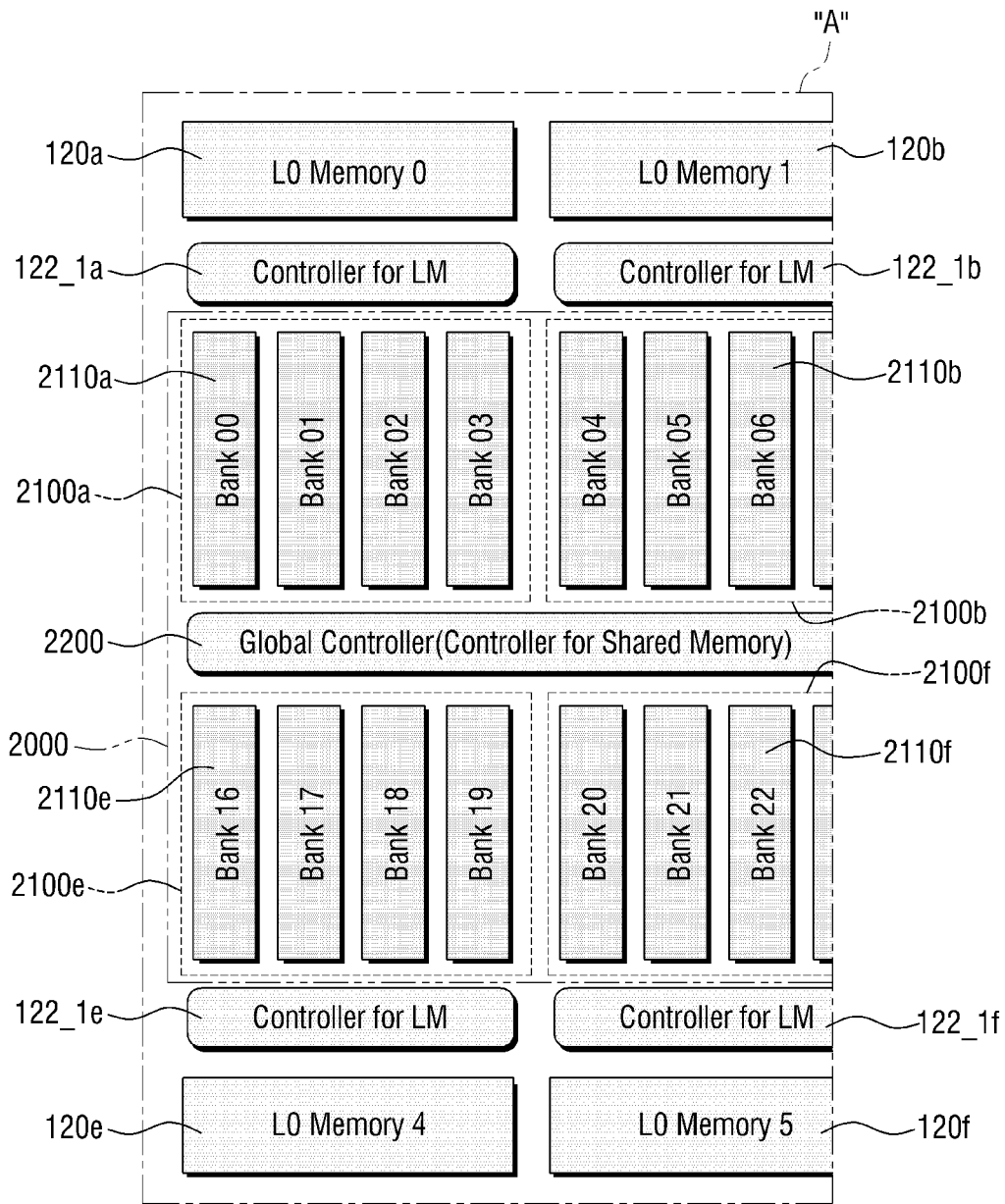
FIG. 26 is an enlarged block diagram of a portion A of FIG. 24.

FIG. 26 is an enlarged block diagram of a portion A of FIG. 24.

With reference to FIGS. 24 and 26, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 1 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 26 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the L0 memory, and even when the need for the global memory is not great, there is no way to utilize the remaining global memory, resulting in inefficiency.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the embodiment, the composition ratio of the memory can be changed during the runtime even when calculation steps change according to each layer, making fast and efficient deep learning tasks possible.

Figure 27:
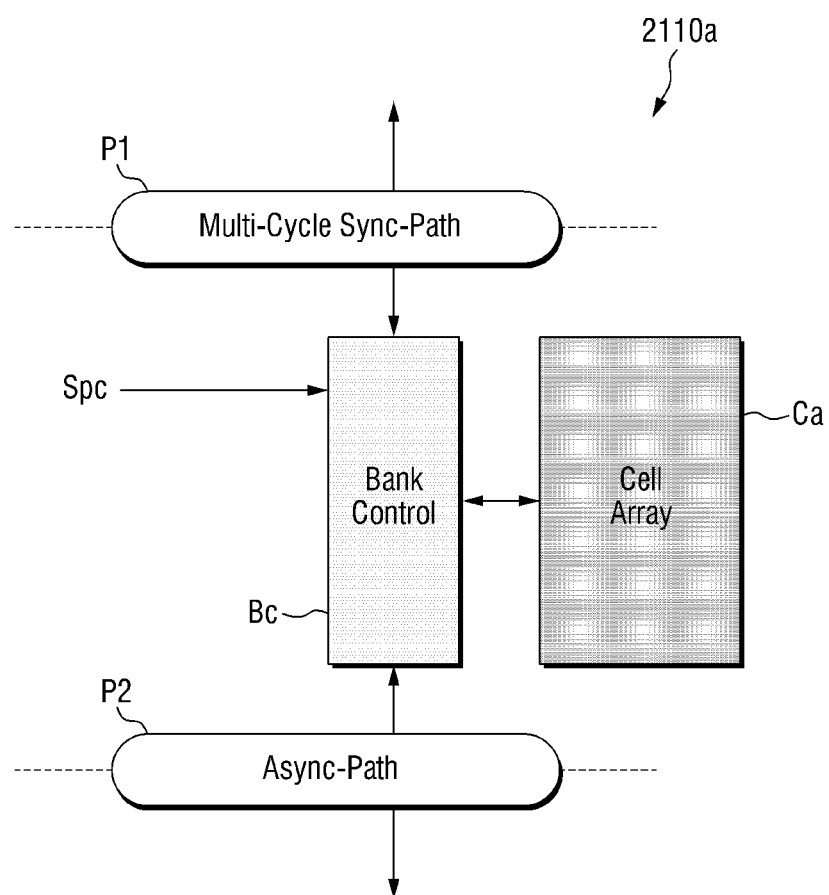
FIG. 27 is a diagram for illustrating the first memory bank of FIG. 26 in detail.

FIG. 27 is a diagram for illustrating the first memory bank of FIG. 26 in detail. Although FIG. 27 illustrates the first memory bank 2110a, other memory banks may also have the same structure as the first memory bank 2110a.

Referring to FIG. 27, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 26.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 27, the operating clock frequency of the first path unit P1 may be 1.5 GHz, as an example. This may be twice the frequency of 750 MHz of the bank controller Bc. However, the embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 26.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to exist for each memory bank. In other words, the bank controller Bc is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 26 and FIG. 27, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 27, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 28:
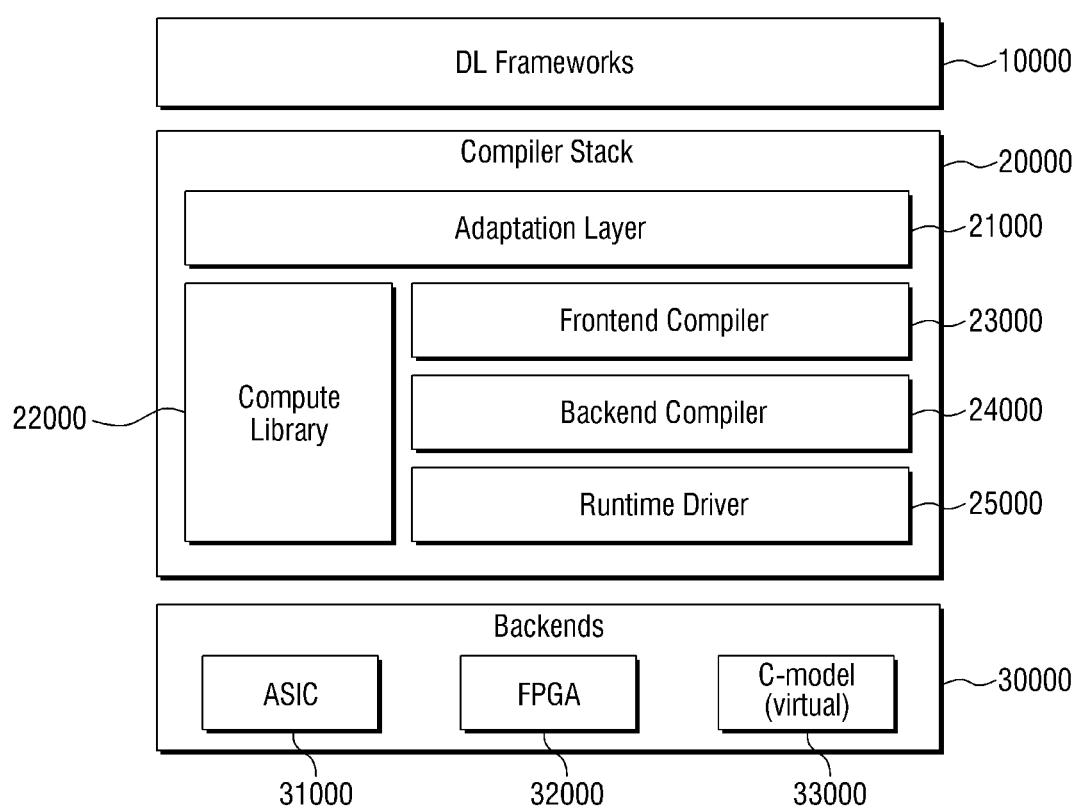
FIG. 28 is a block diagram for illustrating a software hierarchy of a neural processing device in accordance with some embodiments of the disclosure.

FIG. 28 is a block diagram for illustrating a software hierarchy of a neural processing device in accordance with some embodiments of the disclosure.

Referring to FIG. 20, the software hierarchy of the neural processing device in accordance with some embodiments may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 29:
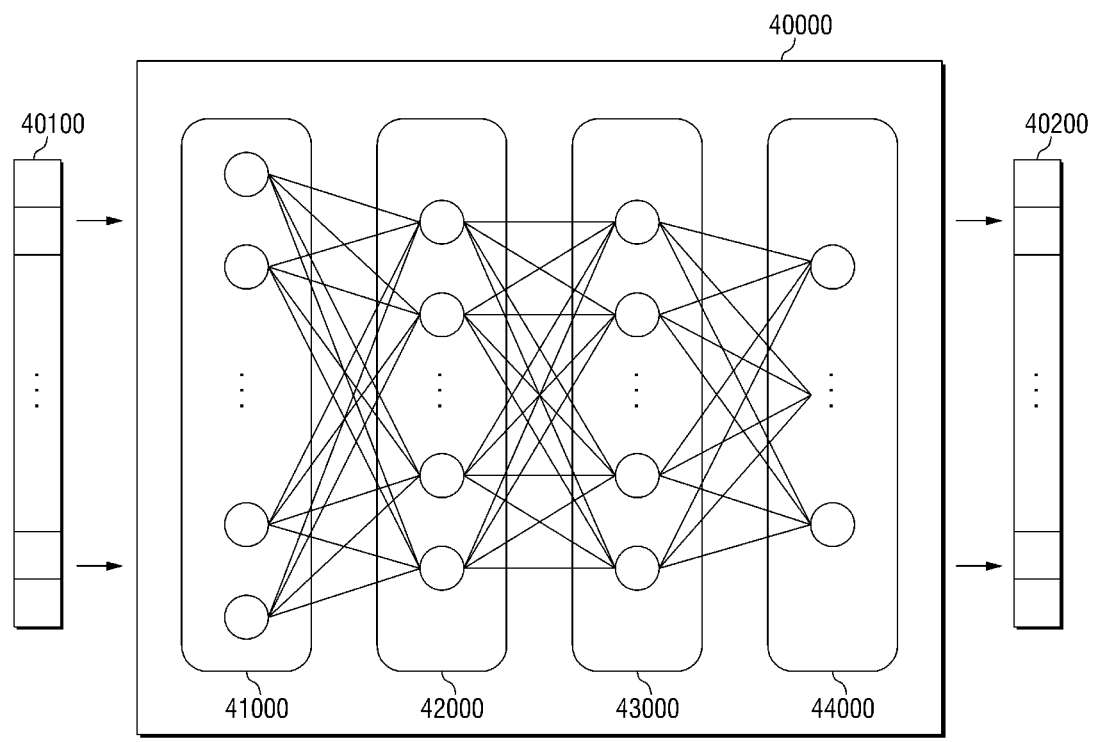
FIG. 29 is a conceptual diagram for illustrating deep learning calculations performed by a neural processing device in accordance with some embodiments of the disclosure.

FIG. 29 is a conceptual diagram for illustrating deep learning calculations performed by a neural processing device in accordance with some embodiments of the disclosure.

Referring to FIG. 29, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 30:
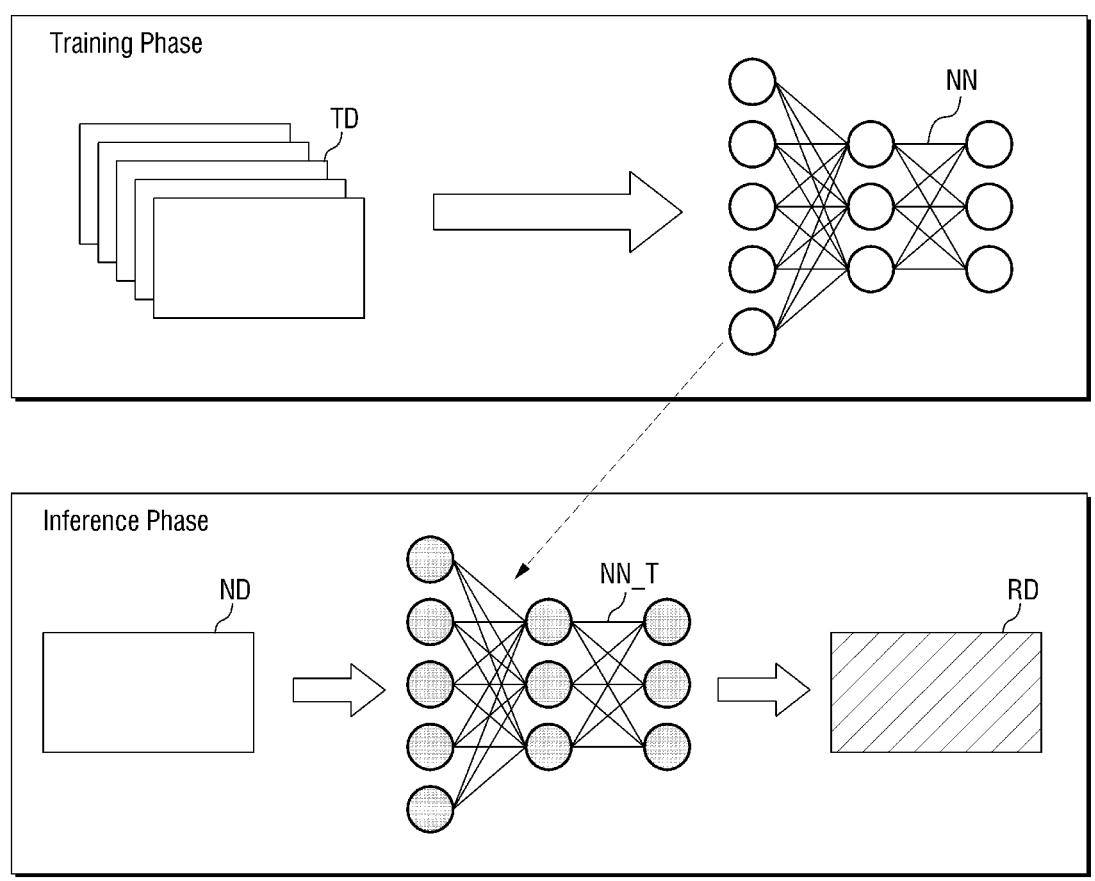
FIG. 30 is a conceptual diagram for illustrating training and inference operations of a neural network of a neural processing device in accordance with some embodiments of the disclosure.

FIG. 30 is a conceptual diagram for illustrating training and inference operations of a neural network of a neural processing device in accordance with some embodiments of the disclosure.

Referring to FIG. 30, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, an operation of an in-order pipeline of a neural processing device in accordance with some embodiments of the disclosure will be described with reference to FIGS. 17 and 31. Any description overlapping with the embodiments described above will be simplified or omitted.

Figure 31:
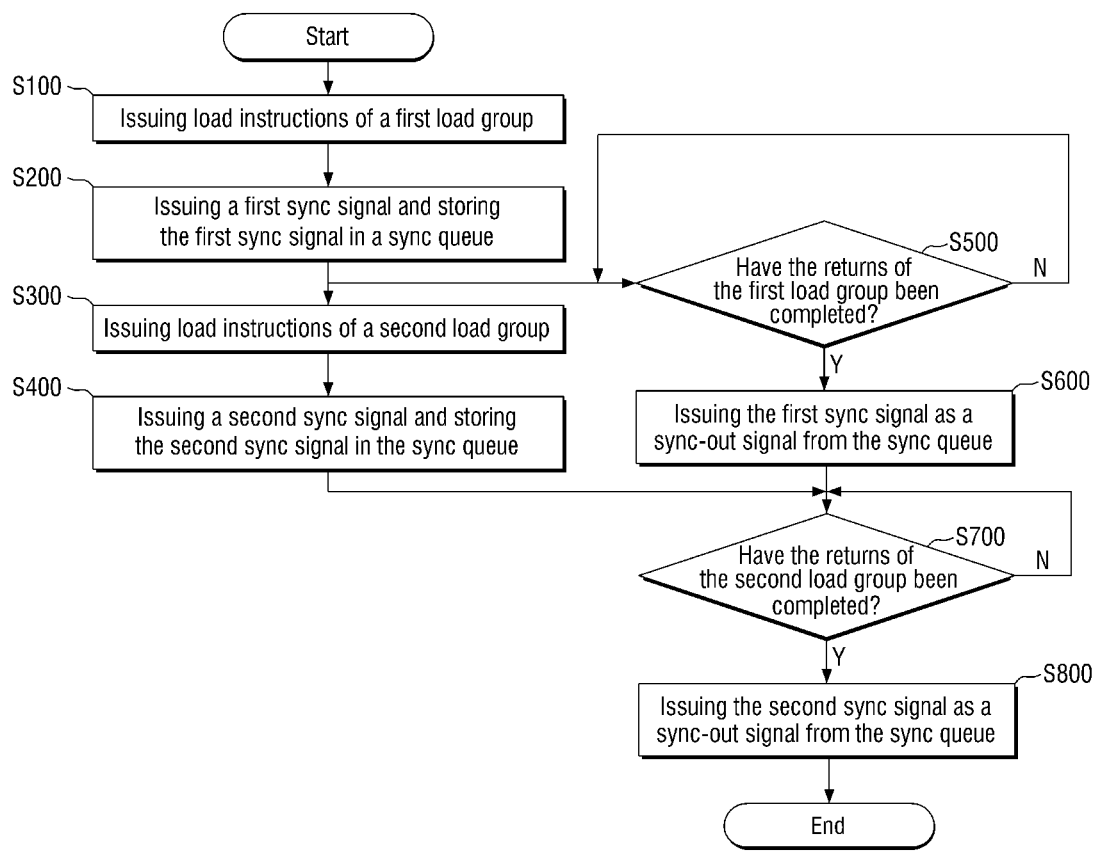
FIG. 31 is a flowchart for illustrating an operation of an in-order execution pipeline of a neural processing device in accordance with some embodiments of the disclosure.

FIG. 31 is a flowchart for illustrating an operation of an in-order execution pipeline of a neural processing device in accordance with some embodiments of the disclosure.

Referring to FIG. 31, load instructions of a first load group are issued S100. Next, a first sync signal is issued and stored in a sync queue S200. Next, load instructions of a second load group are issued S300.

Specifically, referring to FIG. 17, the issue of the load/store instructions of the second group immediately following the issue of the sync signal SYNC0 of the first load group GL1 may be executed with a minimum delay.

Again, referring to FIG. 31, a second sync signal is issued and stored in the sync queue S400. In other words, the first load group GL1 and the second load group GL2 may proceed directly with the issue without an additional waiting time in the issue pipeline.

Meanwhile, in parallel, after step S200, it is determined whether the returns of the first load group have been completed S500. If not, it may be on standby until the returns of the first load group have been completed. If the returns of the first load group have been completed, the first sync signal is issued from the sync queue as a sync-out signal S600.

Specifically, referring to FIG. 17, if the interconnection returns of the first load group GL1 are all completed, the sync signal SYNC0 of the first load group GL1 that has been in the sync queue SQ may be issued as a sync-out signal. As such, an additional time may be required between the issue of the sync signal SYNC0 and the issue of the sync-out signal of the same group.

Referring to FIG. 31 again, when both steps S400 and S600 are completed, it is determined whether the returns of the second load group have been completed S700. If not, it may be on standby until the returns of the first load group have been completed. If the returns of the second load group have been completed, the second sync signal is issued from the sync queue as a sync-out signal S800.

Specifically, referring to FIG. 17, if the interconnection returns of the second load group GL2 are all completed, the sync signal SYNC1 of the second load group GL2 that has been in the sync queue SQ may be issued as a sync-out signal. In this case, the sync queue SQ is of a FIFO structure, and the sync signal SYNC0 of the first load group GL1, which has been issued earlier, may go out as a sync-out signal earlier than the sync signal SYNC1 of the second load group GL2.

Hereinafter, an operation of an in-order pipeline of a neural processing device in accordance with some embodiments of the disclosure will be described with reference to FIGS. 19 and 32. Any description overlapping with the embodiments described above will be simplified or omitted.

Figure 32:
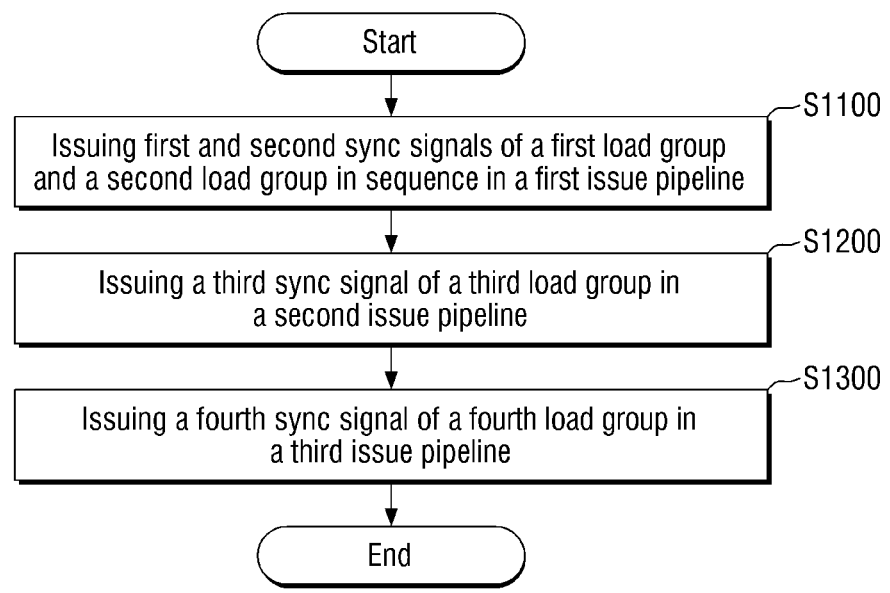
FIG. 32 is a flowchart for illustrating an operation of an out-of-order execution pipeline of a neural processing device in accordance with some embodiments of the disclosure.

FIG. 32 is a flowchart for illustrating an operation of an out-of-order execution pipeline of a neural processing device in accordance with some embodiments of the disclosure.

Referring to FIG. 32, first and second sync signals of a first load group and a second load group are issued in sequence in a first issue pipeline S1100.

Specifically, referring to FIG. 19, the sync signal SYNC0 of the first load group GL1 and the sync signal SYNC1 of the second load group GL2 may be issued in sequence in the first issue pipeline PL1. The first load group GL1 and the second load group GL2 may have a dependency by which they must proceed in sequence. The issue of the load instructions of the first load group GL1 and the second load group GL2 may proceed right away without an additional waiting time.

Again, referring to FIG. 32, a third sync signal of a third load group is issued in a second issue pipeline S1200.

Specifically, referring to FIG. 19, the sync signal SYNC2 of the third load group GL3 may be issued in the second issue pipeline PL2, which is different from the first issue pipeline PL1. In this case, despite the different issue pipelines, the respective load groups may be performed in sequence without any waiting time just like a single pipeline.

Again, referring to FIG. 32, a fourth sync signal of a fourth load group is issued in a third issue pipeline S1300.

Specifically, referring to FIG. 19, the sync signal SYNC3 of the fourth load group GL4 may be issued in the third issue pipeline PL3, which is different from the first issue pipeline PL1 and the second issue pipeline PL2. In this case, despite the different issue pipelines, the respective load groups may be performed in sequence without any waiting time just like a single pipeline.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the invention.

What is claimed is:

1. A neural processing device comprising:
a processing unit configured to perform calculations;
an L0 memory configured to receive data from the processing unit and provide data to the processing unit;
an LSU (Load/Store Unit) configured to perform load and store operations of the data; and
wherein the LSU comprises:
a neural core load unit configured to issue a load instruction of the data;
a neural core store unit configured to issue a store instruction for transmitting and storing the data; and a sync ID logic configured to provide a sync ID to the neural core load unit and the neural core store unit to thereby cause a synchronization signal to be generated for each sync ID, and store at least one of sync signal associated with the sync ID in a sync queue.

2. The neural processing device of claim 1, wherein instructions comprise the load instruction and the store instruction, the instructions comprise at least one group, and each of the at least one group comprises at least one operation instruction, and a sync signal indicating completion of an issue of the operation instruction.

3. The neural processing device of claim 2, wherein the sync ID logic comprises:

a current sync ID register configured to store a sync ID associated with the at least one group of the instructions being issued;

a sync ID counter configured to update a plurality of counters according to the number of issues of the operation instructions and interconnection returns for the operation instructions for the sync ID; and where in the sync queue configured to store the least one of sync signal by a group, and send out the at least one of sync signal when an associate counter becomes 0.

4. The neural processing device of claim 3, wherein the at least one group comprises a first group and a second group, and the sync ID counter comprises:

a first counter configured to count MOs of the first group; and a second counter configured to count MOs of the second group.

5. The neural processing device of claim 4, wherein the first counter is increased by 1 each time the operation instruction of the first group is issued.

6. The neural processing device of claim 4, wherein the first counter is decreased by 1 each time the interconnection return for the operation instruction of the first group is returned.

7. The neural processing device of claim 4, wherein the sync queue:

stores a sync signal of the first group when issued, stores a sync signal of the second group in sequence subsequent to the sync signal of the first group when issued, outputs the sync signal of the first group when the first counter becomes 0, and outputs the sync signal of the second group when the second counter becomes 0.

8. The neural processing device of claim 7, wherein the sync queue outputs the sync signal of the first group and the sync signal of the second group in sequence.

9. The neural processing device of claim 4, wherein the at least one group further comprises a third group, the first group and the second group have a dependency on each other, and the third group is independent of the first and second groups.

10. The neural processing device of claim 9, wherein a first time between an issue end time of the operation instructions of the first group and an issue start time of the operation instructions of the second group is equal to a second time between an issue end time of the operation instructions of the second group and an issue start time of the operation instructions of the third group.

11. The neural processing device of claim 1, wherein the sync queue is of a FIFO (First In, First Out) structure.

12. The neural processing device of claim 3, wherein the current sync ID register changes and stores the sync ID of a group corresponding to the sync signal after a preset fixed cycle when the sync signal is issued.

13. The neural processing device of claim 2, further comprising a local interconnection configured to receive data from the LSU and transmit the data, wherein when the operation instruction is issued, an interconnection request according to the operation instruction is transmitted to the local interconnection, and time points of a transmission of the interconnection request and an issue of the operation instruction differ by a preset fixed cycle.

14. The neural processing device of claim 13, wherein the local interconnection transmits an interconnection return corresponding to the interconnection request to the LSU; and time points of a reception of the interconnection return and the transmission of the interconnection request differ by a non-fixed cycle that is not predetermined.

* * * * *